US011678655B2

(12) United States Patent
Wood et al.

(10) Patent No.: US 11,678,655 B2
(45) Date of Patent: Jun. 20, 2023

(54) BOAT HUNTING BLIND INCLUDING A SPRING-LOADED AUTO-LEVELING LEG WITH DUAL-ACTION TOP

(71) Applicant: Icon Outdoors, LLC, Olive Branch, MS (US)

(72) Inventors: Tate Wood, Olive Branch, MS (US); Bobby L. Windham, Jr., Olive Branch, MS (US); James L. Spence, Olive Branch, MS (US)

(73) Assignee: Icon Outdoors, LLC, Olive Branch, MS (US)

( * ) Notice: Subject to any disclaimer, the term of this patent is extended or adjusted under 35 U.S.C. 154(b) by 153 days.

(21) Appl. No.: 17/112,960

(22) Filed: Dec. 4, 2020

(65) Prior Publication Data

US 2021/0298287 A1    Sep. 30, 2021

Related U.S. Application Data

(60) Provisional application No. 62/942,229, filed on Dec. 2, 2019.

(51) Int. Cl.
*A01M 31/02*      (2006.01)
*B63B 17/02*      (2006.01)

(52) U.S. Cl.
CPC .......... *A01M 31/025* (2013.01); *B63B 17/02* (2013.01)

(58) Field of Classification Search
CPC ....... B63B 17/00; B63B 17/02; A01M 31/025
USPC ......................................... 114/361
See application file for complete search history.

(56) References Cited

U.S. PATENT DOCUMENTS

| 3,323,530 | A | | 6/1967 | Smith | |
|---|---|---|---|---|---|
| 4,070,722 | A | * | 1/1978 | Sutherland | B63B 17/02 135/117 |
| 5,458,079 | A | * | 10/1995 | Matthews | B63B 17/02 114/361 |
| 5,615,633 | A | * | 4/1997 | Cripe | B63B 17/02 114/361 |
| 6,769,379 | B2 | * | 8/2004 | Foiles | B63B 17/02 114/361 |
| 7,063,035 | B2 | * | 6/2006 | Belcher | B63B 17/02 114/361 |
| 7,401,566 | B1 | | 7/2008 | Miknich | |
| 9,279,268 | B2 | * | 3/2016 | Liu | B63B 17/02 |
| 2004/0139906 | A1 | | 7/2004 | Dunn | |

* cited by examiner

*Primary Examiner* — Lars A Olson
(74) *Attorney, Agent, or Firm* — Warren D. Schickli; Stites & Harbison PLLC

(57) ABSTRACT

Boat hunting blind for use on hunting boat for water-based waterfowl hunting including blind side panel and blind top panel. Blind side panel includes front panel, end panel mounted to front panel and rear panel mounted to end panel. Front panel and rear panel include legs having blind collapsing mechanism having spring mounted to corner bracket connecting the front panel, end panel and rear panel for allowing legs to collapse and stand in collapsed position and upright position. Blind top panel includes front top panel and rear top panel pivotally mounted to center brackets mounted to end panel. Boat hunting blind includes skirt suspended from blind side panel enveloping the blind side panel for camouflaging hunter, and blind top mounted over blind top panel for concealing hunter from above. Front top panel or rear top panel including blind top is thrown back providing open top for hunter to shoot waterfowl.

21 Claims, 21 Drawing Sheets

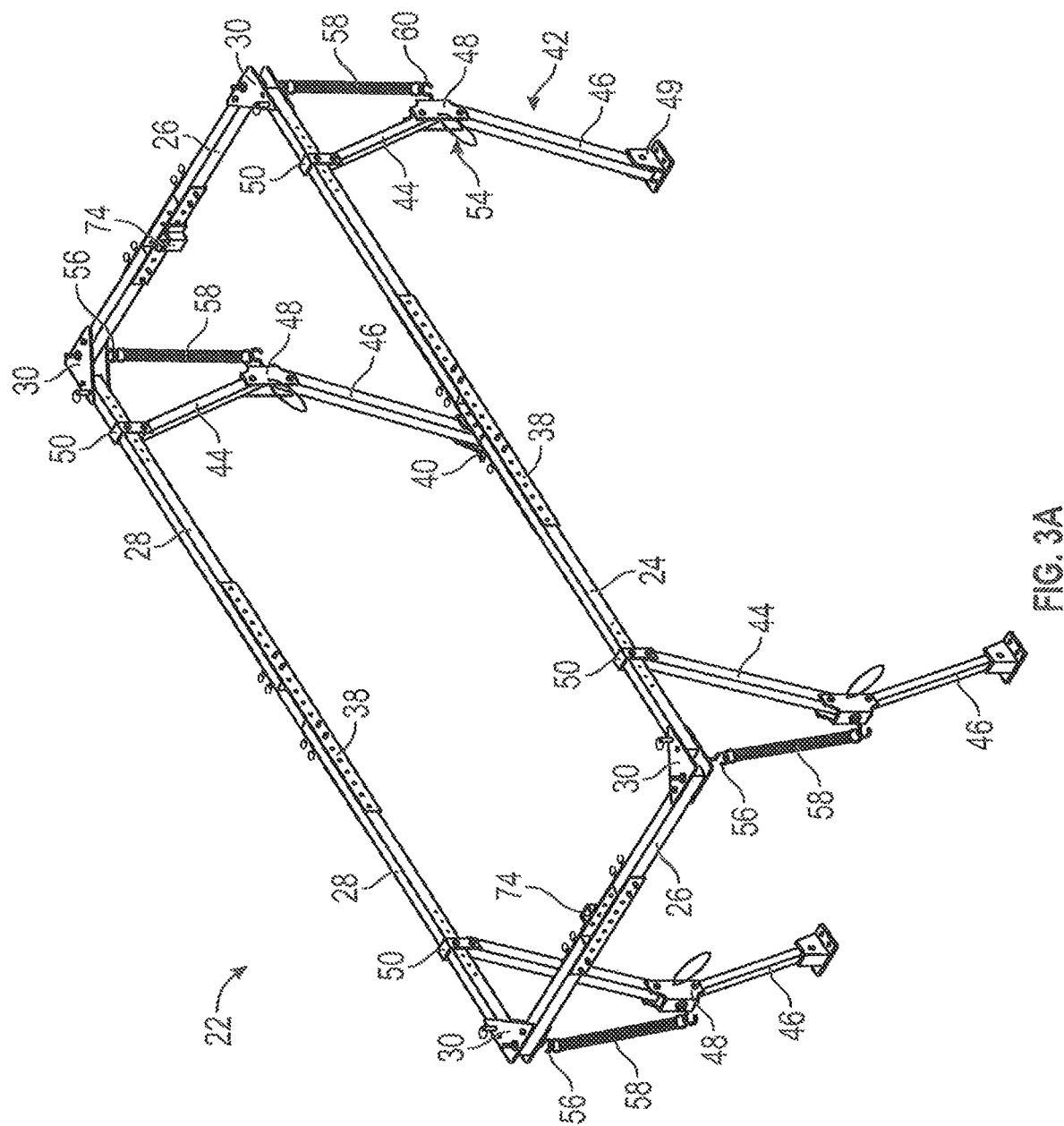

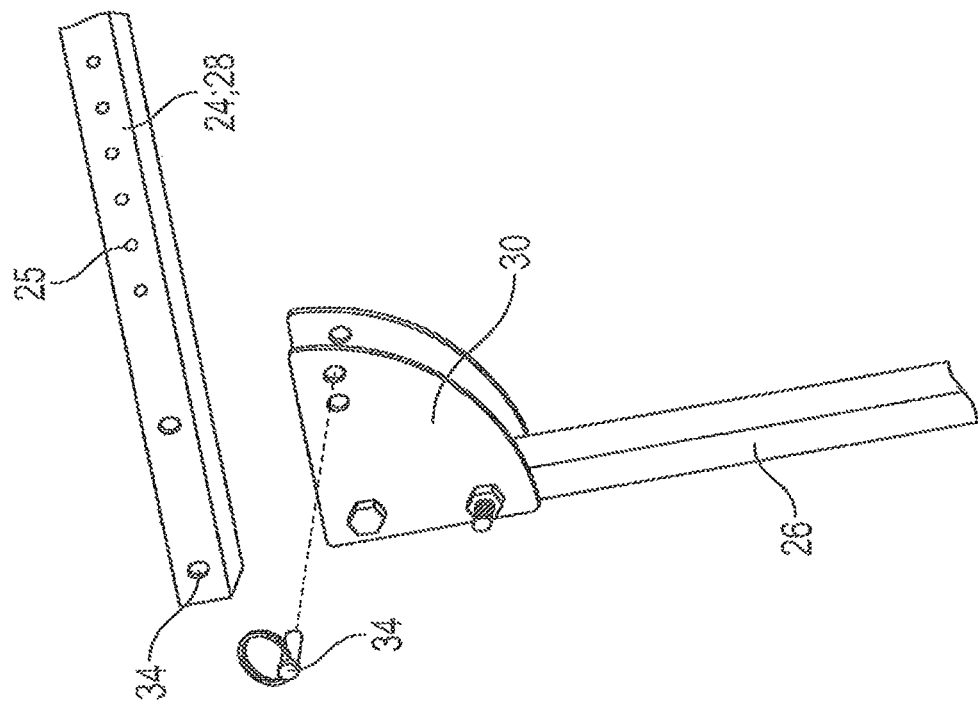
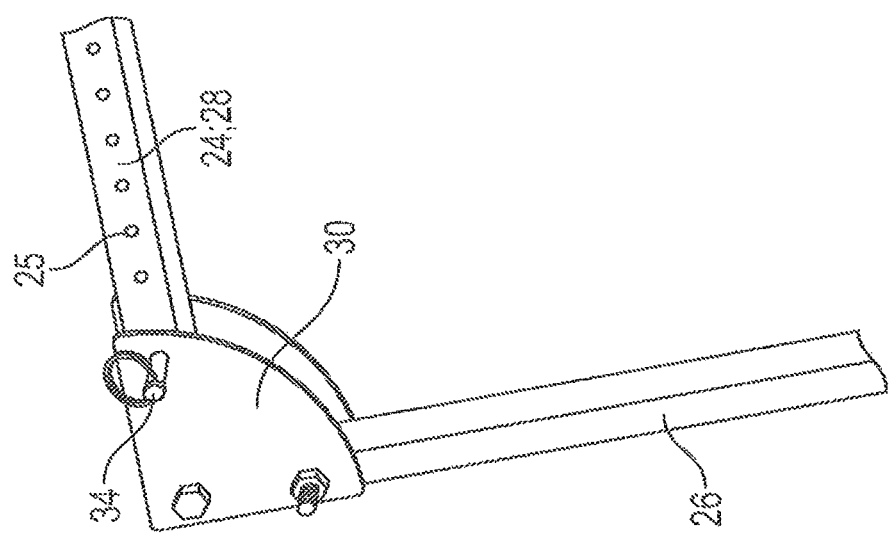

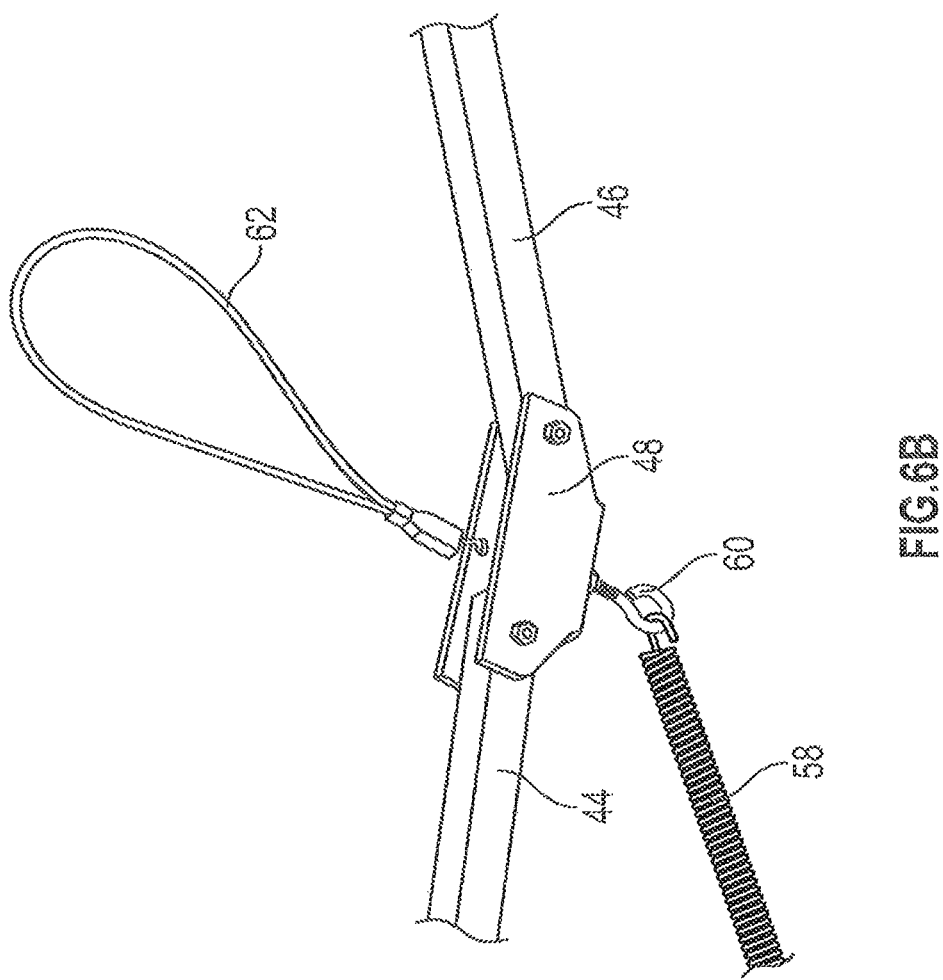

BOAT HUNTING BLIND INCLUDING A SPRING-LOADED AUTO-LEVELING LEG WITH DUAL-ACTION TOP

FIELD OF THE DISCLOSURE

The present disclosure relates to blinds for concealing hunters and, more particularly, to a portable hunting blind requiring no additional equipment, tools, or people to easily assemble and providing camouflage to enable a hunter to appear as part of the environment during hunting or photographing wildlife and especially on a hunting boat for water-based waterfowl hunting.

BACKGROUND OF THE DISCLOSURE

A hunting blind is a cover device for hunters or gamekeepers, designed to reduce the chance of detection. There are different types of blinds for different situations, such as deer blinds and duck blinds. Some are exceedingly simple, while others are complex. The legality of various kinds of blinds may vary according to season, state and location.

Duck blinds may be stable or mobile. The ground blinds are an alternative to the traditional tree stand. Movements in a well-designed ground blind can virtually be undetectable by the game. The duck blinds also can be quite elaborate and their purpose may often extend beyond concealment to include protection from the elements, particularly from rain and cold. In some areas, the blinds can approach small cabins in their size and amenities. Also, for hunting waterfowl in fields, hunters may use a layout blind. A layout blind is a low profile blind that a person can lay down in and stubble in to hide from waterfowl. Moreover, some blinds may be portable.

Field blinds have been made for many years. In the last decade, portable field blinds have become popular. Most of these require assembly, in the field, involving loose parts. Handling loose parts in the dark can be frustrating, particularly when the hunter would prefer to be hunting and shooting. The challenge is to make a blind that is large and roomy enough for three to five hunters. This requires an area of approximately 6-10' end-to-end and about 3-4' front to back. However, most blinds are 4' at the base and narrow to around 3' at the top opening.

Commercially available blinds require the hunters to duck their head and keep their face down. When there are more than three to five hunters, controlling the "movement" becomes difficult. Also, waterfowl flare or spook easily, especially when the hunters turn and look up in the sky. These movements can totally defeat the purpose of the hunting blind.

Some hunting blinds seek to solve this problem by providing a blind top. Typically, a top operates one of two ways, it either falls forward or hits the frame or it throws backward. The problem with the tops that fall forward is the requirement for netting to look through. Sometimes looking through netting is inhibiting, depending on the type of netting being used. When the hunter throws the top forward to cause it to collapse on the front of the blind, he frequently loses sight of the game.

Hunters also often use tall cane or sagebrush that can be 3 to 5' tall to camouflage a hunting blind. Frequently this brush may be several feet higher than the frame of the blind. As a result, this tall brush prevents a top from falling to the outside of a blind. The tops can be made to fall forward to the outside of the walls. Because of this limitation, there is a need for the blind top to fall forward or backwards inside the confines or on top of the walls. This can prevent the top from contacting or damaging the brush outside the blind.

It is important that the top height be adjustable. Some hunters will want no gap to see out of, they are more concerned about being hidden, while some will want to be able to see freely out of front, rear and sides of the blinds.

One example is disclosed in a U.S. Pat. No. 3,323,530, entitled "Sportsman's Blind" (the "'530 patent"). The '530 patent discloses a portable shelter structure including, a frame having upright corner posts, cross rails extending between adjacent the posts at the tops thereof, means to interlock the posts and the cross rails in fixed relationship when assembled. A flexible covering having an elongated portion extends laterally around the framework to define sides and another portion extending away from the elongated portion to define a top, the top terminating in a free edge having a hem, a stiffener rod in the hem, securing means on the ends of the elongated portion for fastening the ends together and for maintaining the flexible covering on the framework. A releasable hook means on one of the cross rails to engages the stiffener rod and hold the top portion extended across the framework, and resilient means between the stiffener rod and the cross rail opposite the one cross rail to open the top when the hook means is tripped.

Although the blind is quite useful, if a hunter or group of hunters have to access the blind by a boat, it seems inconvenient to have to use the boat to get to the site and then establish a blind on shore. Several prior art disclosures have tried to provide a boat hunting blind mounted atop a pontoon-based water craft which is particularly suited to facilitate the carrying of a hunter, or more particularly the concealing of a hunter, for aid in hunting game, particularly waterfowl.

An example of a boat hunting blind is disclosed in a U.S. Patent application No. 2004/0139906A1, entitled "Boat mounted hunting blind" (the "'906 Publication"). The '906 Publication discloses a boat mounted hunting blind to aid hunters in hunting game, particularly water fowl; wherein, at least two pontoons are connected together, preferably in parallel orientation, by way of a bridging platform. Above the platform there is hingedly attached a collapsible canopy, preferably camouflaged in design, within which the hunter may be concealed in a seated or standing position while scouting and shooting game. Above the canopy there is removably attached a detachable roof, preferably camouflage in design, for providing weather protection for the hunter and further concealment.

Another example is disclosed in a U.S. Pat. No. 7,401,566, entitled "Hunting blind boat cover" (the "'566 patent"). The '566 patent discloses a hard-shell cover hunting blind for a boat that may be left on while transporting the boat to the water. The shell has an open back that allows full visibility when moving. A camouflage covering is secured to a hoop in the back that can be quickly dropped down. Two large clamshell doors are placed in the front. The shell has a sliding door that opens up the sides of the blind. This provides easy access into and out of the boat as well as for placing decoys, etc. In addition, there is a curved top that is mounted on slides. This top can be pulled to either side to provide a full 360° field of vision and a large shooting port. No tools are needed to operate the system of doors or to remove and install the clamshell front pieces.

Each of the above-referenced portable blinds has limitations. Therefore, there is a need for improvement in the structure and functions, use and manufacture of blinds for hunting and other purposes. The present disclosure makes possible a number of the needed solutions and makes a material and substantial improvement to the current state of the art in portable blinds for hunting and related purposes.

BRIEF SUMMARY OF THE DISCLOSURE

The present disclosure includes a boat hunting blind that can be used on a hunting boat for water-based waterfowl hunting. The boat hunting blind includes a blind side panel and a blind top panel including fabric portions for concealing a hunter.

In order to achieve to overcome the limitations here stated, the present invention provides a boat hunting blind for concealing a hunter, including a skeletal frame for supporting a plurality of blind side panel (a panel in this case is a wind blocker attached to the aluminum tubing that makes a panel or wall) and at least one blind top panel, the frame including a plurality of modular and adjustable interconnectable tubular elements, the interconnectable tubular elements connectable to provide the skeletal frame having the dimensions of a blind for use in a hunting environment. The skeletal frame length and width is adjustable and allows for mounting to boats of different sizes. A plurality of fabric portions for associating with the skeletal frame for forming a skirt, and at least one blind top panel. The skeletal frame and the plurality of fabric portions having a portable and modular construction and a weight sufficiently light for a hunter to carry into a boat for assembling into the blind for a hunting trip. However, the hunter may install the presently disclosed boat hunting blind to a boat and retain it until after the season. The boat hunting blind remains on the boat until after the season, where it can be quickly removed freeing up to use the boat for fishing.

The boat hunting blind includes at least one of the plurality of fabric portions for use with the plurality of blind side panel includes a see-through mesh for permitting a hunter to see flying game while concealing the hunter inside the plurality of blind side panel. Further, the boat hunting blind includes at least one of the plurality of fabric portions for use with the at least one blind top panel includes a see-through mesh for permitting a hunter to see flying game while concealing the hunter behind the at least one blind top panel. The plurality of fabric portions for use with the at least one blind top panel eliminates shadow thus making no-shadow top. Further, the blind side panel interconnect to provide a camouflaged wall perimeter for concealing at least one hunter from flying or land-based game during a hunt.

A blind top panel adjustment mechanism including a plurality of adjustable support structures for firmly, but releasably, engaging the at least one blind top panel for permitting either the flipping back of the blind top panel or holding the blind top panel horizontal at a plurality of heights relative to the top portion of the camouflaged wall perimeter, ranging from flush with the top of the camouflaged wall perimeter to sufficiently above the camouflaged wall perimeter for permitting the hunter to be covered by the at least one blind top panel, while viewing clearly outside and above the blind to see flying or land-based game during the hunt.

The see-through mesh top allows the hunters to lean away from the front opening of the blind, beneath the see-through top and look upwards, without being detected by the waterfowl. It also allows the hunters to keep eyes on what they ducks are doing. The blind top acts like a mesh overhanging on the top edges and adds further concealment. This presents an advantage that a hunter can tie the mesh and create an unencumbered see through opening.

The at least one blind top panel allows it to be thrown up and behind the hunters. Because of this feature, hunters never lose visual track of the birds.

According to one aspect of the presently disclosed subject matter, there is provided an improved boat hunting blind as herein described.

In view of the above, it is an object of the present invention to provide a boat hunting blind, which can be mounted on a boat to aid hunters in hunting game, particularly waterfowl.

It is another object of the present invention to provide a boat hunting blind that can be quickly and easily collapsed or detached for transport or storage, which allows a hunter to view game/waterfowl and shoot from top of the boat hunting blind.

It is another object of the present invention to provide a boat hunting blind that allows the hunters to use the entire front to back and end to end at the top of the boat hunting blind for spotting birds/waterfowls and to be able to throw up the top.

It is another object of the present invention to provide a boat hunting blind including a spring-loaded auto-leveling leg mechanism for lifting the boat hunting blind, with one hand, by grabbing the front and rear panels. Once lifted, the spring-loaded auto-leveling leg mechanism helps to lift the boat hunting blind and when the legs reach vertical position, the springs pull the legs back further until they hit a bracket/stop. Here, gravity pulls down the legs because they are inverted, and it holds the knee joints of the legs firmly against the brace/bracket. When in the locked position, the springs enable both legs to simultaneously lift and lock, unlike known blinds where a hunter has to handle each leg individually when trying to pin/lock the knee, so the blind will stand upright.

Other objects, technical aspects and advantages of the presently disclosed boat hunting blind with simple, reliable, and quick setup and take-down hunting and other outdoor sporting activities will become apparent upon reading the technical description appearing below.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIGS. 3A and 3B illustrate a perspective and side view, respectively of a blind side panel of the skeletal frame;

FIGS. 4A and 4B illustrate a corner bracket in installed and uninstalled position, respectively for the boat hunting blind;

FIGS. 6A and 6B illustrate a leg including a blind collapsing mechanism for adjusting height of the boat hunting blind;

DETAILED DESCRIPTION OF ILLUSTRATIVE EMBODIMENTS

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed boat hunting blind.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of a boat hunting blind, it should be understood that the description is by way of example only and is not to be construed in a limiting sense. It is to be further understood that numerous changes may arise in the details of the embodiments of this portable and modular hunting blind. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
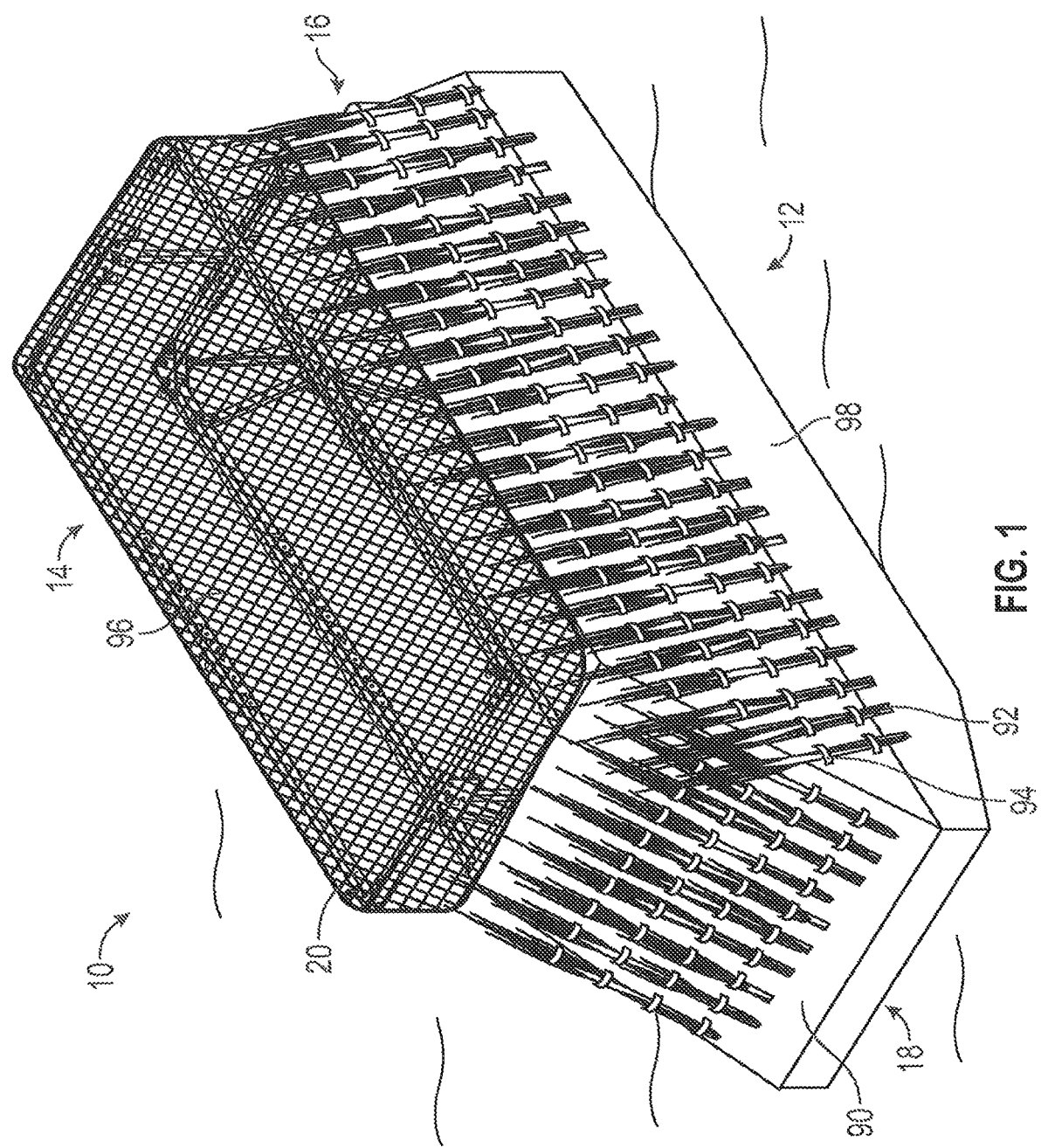
FIG. 1 shows an elevated perspective view of a boat hunting blind of the present disclosure.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a perspective view of boat hunting blind 10 is shown, in accordance with one embodiment of the present invention. Boat hunting blind 10 includes skeletal frame 20, skirt 90 and blind top 96. Boat hunting blind 10 includes front side 12, rear side 14, right side 16 and left side 18. It should be understood that front side 12, rear side 14, right side 16 and left side 18 herein are used for illustrating sides of boat hunting blind 10 and should not be construed in a limited sense.

Figure 2:
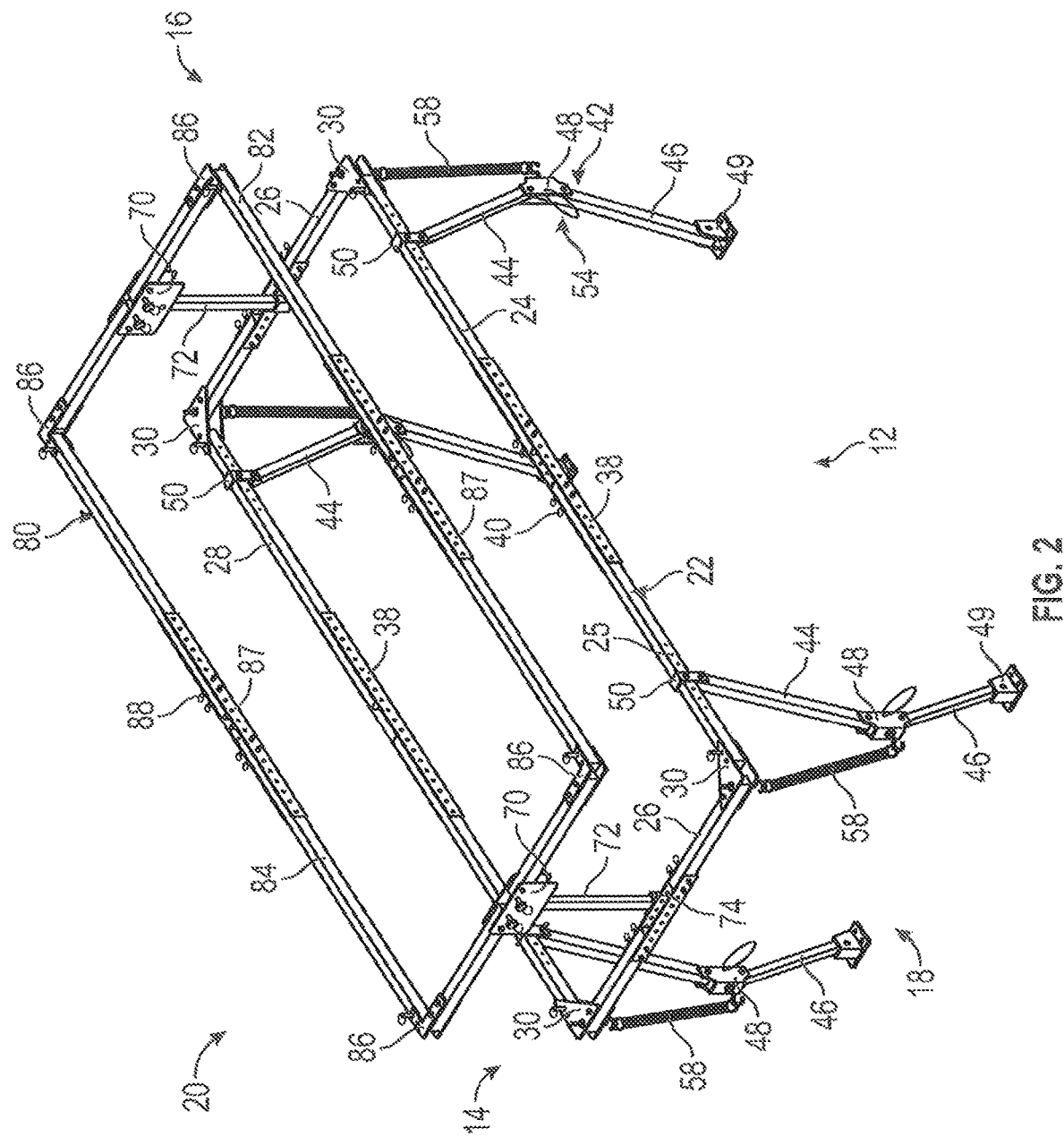
FIG. 2 provides an elevated perspective view of a skeletal frame of the boat hunting blind.
Figure 3B:
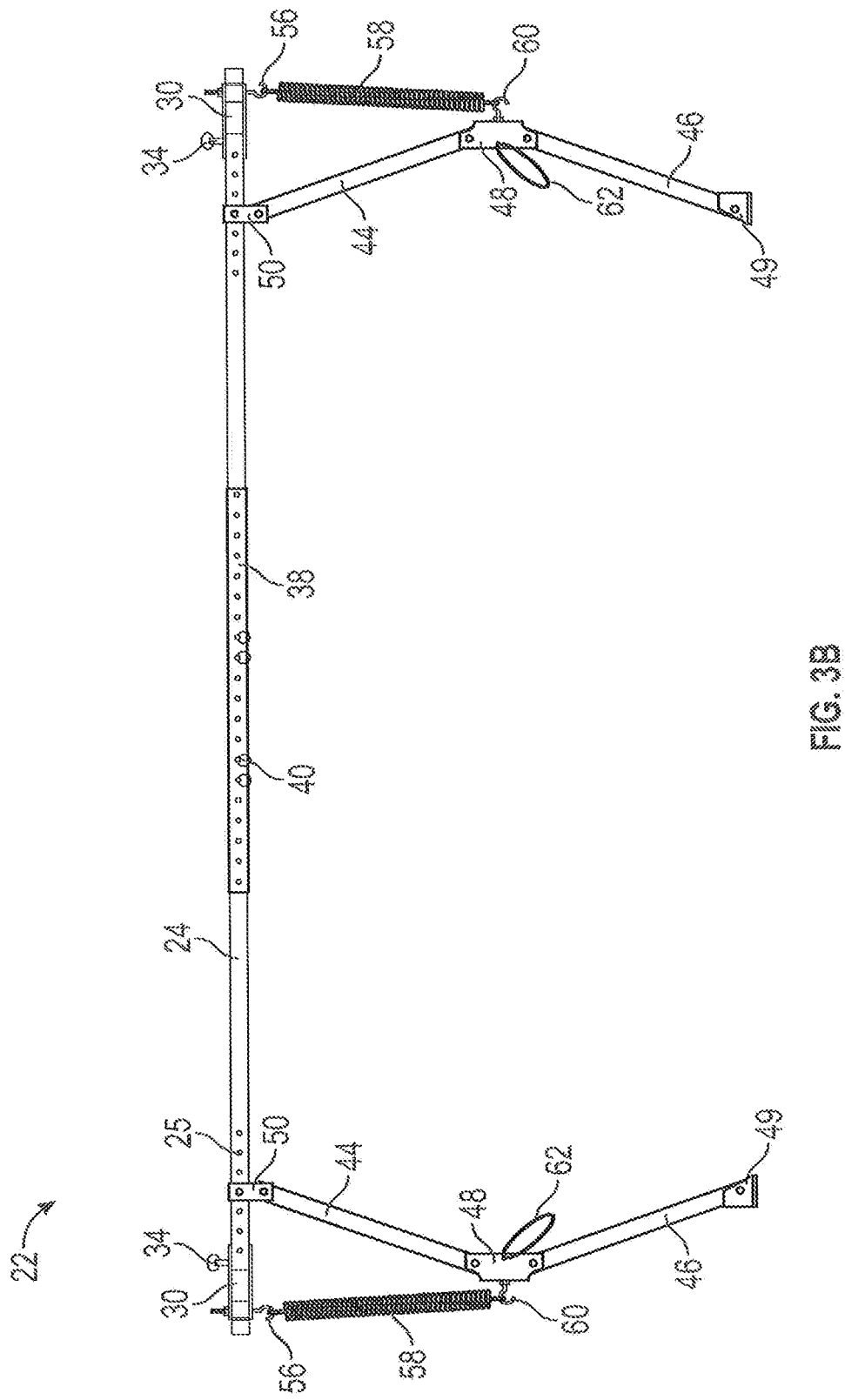

Referring to FIG. 2, a perspective view of skeletal frame 20 is shown, in accordance with one embodiment of the present invention. Skeletal frame 20 includes blind side panel 22 and blind top panel 80. Blind side panel 22 may indicate a main frame and blind top panel 60 may indicate a top frame mounted over blind side panel 22. Constructional features of blind side panel 22 are explained with the help of at least FIGS. 3A and 3B. FIGS. 3A and 3B show a perspective and a side view, respectively of blind side panel 22. Blind side panel 22 includes front panel 24, end panel 26 and rear panel 28. Further, each of front panel 24 and rear panel 28 includes a series of holes 25. Holes 25 allow to adjust the length of front panel 24 and rear panel 28. As can be seen, front panel 24 is mounted to end panel 26 at one end and other end of end panel 26 are mounted to rear panel 28. Front panel 24 indicates a panel or wall provided at front side 12. An end panel 26 indicates a panel provided at right side 16 or left side 18. Rear panel 28 indicates a panel provided at rear side 14. In one example, front panel 24, end panel 26 and rear panel 28 may be made with aluminum square tubing. Front panel 24 and rear panel 28 are mounted to end panel 26 using corner bracket 30.

FIGS. 4A and 4B show corner bracket 30 in installed and uninstalled position, respectively. As can be seen, one end of corner bracket 30 is mounted to end panel 26 using fastener 32 and other end is mounted to front panel 24 or rear panel 28 by inserting corner bracket pin 34 into bracket hole 35 provided in corner bracket 30 and into panel hole 36 provided at front panel 24 or rear panel 28.

Figure 5:
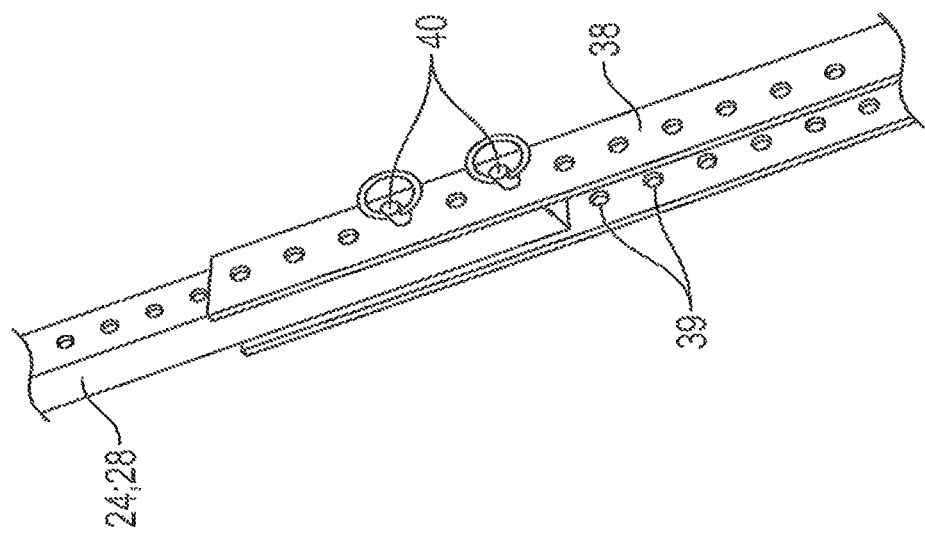
FIG. 5 illustrates a U-channel for the boat hunting blind that helps to adjust the length and width of the boat hunting blind.

In one implementation, each front panel 24, end panel 26 and rear panel 28 may be provided in two panels of varied length. In order to mount front panel 24, end panel 26, and rear panel 28, U-channel 38 may be used as can be seen from at least FIGS. 2, 3A and 3B. Referring to FIG. 5, U-channel 38 is explained. As can be seen, U-channel 38 includes holes 39. For instance, front panel 24 may be mounted by inserting pins 40 into holes 39 provided at U-channel 38 and holes (not shown) provided at front panel 24. Holes 39 in U-channel 38 allow to quickly adjust the length and put pins 40 in to set the length, without having to drill additional holes and save installation time. Alternatively, front panel 24 may be left loose in U-channel 38.

Figure 6A:
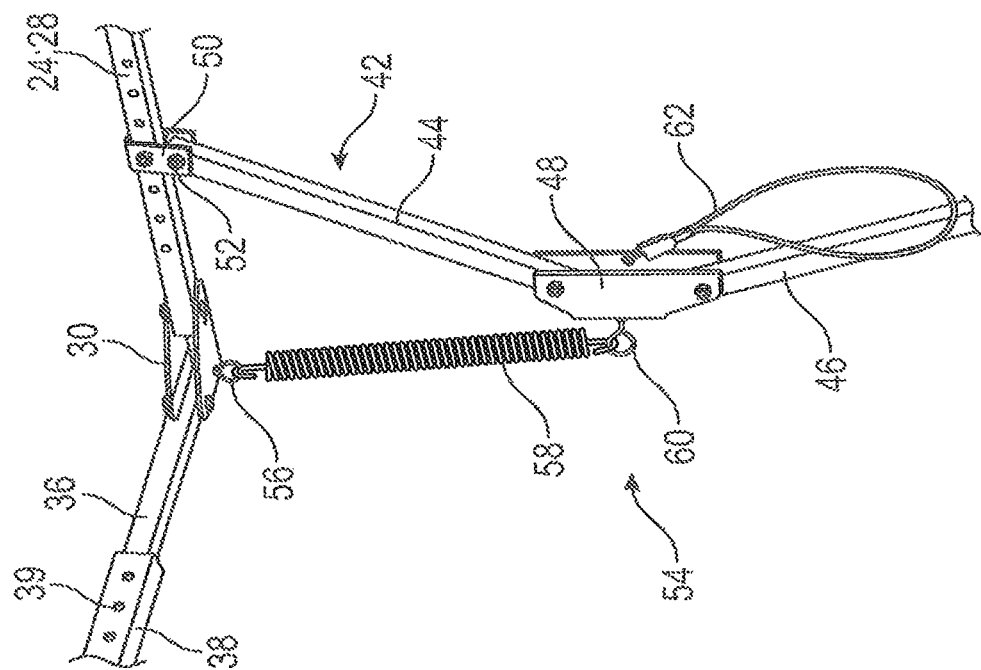

Further, blind side panel 22 includes legs 42 provided at each of front panel 24 and rear panel 28 for allowing front panel 24 and rear panel 26 to be placed at a height from the ground or surface. Legs 42 can be seen in at least FIGS. 2, 3A and 3B. Each leg 28 uses ¾" square tubing. Further, referring to FIGS. 6A and 6B, construction of legs 42 is explained. In the current embodiment, each of legs 42 includes two parts, first part 44 and second part 46 mounted using center stop bracket 48. Second part 46 may indicate a bottom leg that is in contact with ground/surface. First part 42 may indicate an upper leg mounted above second part 46. It should be understood that first part 44 and second part 46 are pivotally mounted to center stop bracket 48. Each of legs 42 includes a foot 49 at the bottom as shown in at least FIG. 2. Foot 49 mounts to a boat and helps to secure boat hunting blind 10 to the boat. Each of legs 42 mounts to front panel 24 or rear panel 28 using U-clip 50 with the help of fastener 52. U-clip 50 mounts to front panel 24 or rear panel 28 at different holes 25 such that legs 42 position can be adjusted depending on the need. FIG. 6A shows leg 42 mounted to front panel 24, for example. Specifically, first part 44 of leg 42 is mounted to front panel 24 or rear panel 28 using U-clip 50.

Each of legs 42 includes blind collapsing mechanism 54. Blind collapsing mechanism 54 includes a loop 56 mounted to corner bracket 30 at bottom side of corner bracket 30 facing the ground or surface, as can be seen from FIG. 6A. In one embodiment, loop 56 mounts to front panel 24 and rear panel 28. Loop 56 indicates a closed loop or hook. Loop 56 mounted at front panel 24 and rear panel 28 helps to fold (FIGS. 10A and 10B) end panel 26 and allows for easy transport. Based on the above, a person skilled in the art understands that loop 56 mounts either at corner bracket 30, or at front panel 24 and rear panel 28. Further, blind collapsing mechanism 54 includes a spring (i.e., spring coil) 58, in which one end of spring 58 is mounted to loop 56 and another end is mounted to hook 60 provided at center stop bracket 48. Further, blind collapsing mechanism 54 includes pull wire 62 mounted to hook 60. It should be understood that a user of boat hunting blind 10 may hold pull wire 62, as shown in FIG. 6B, to pull down front panel 24 and/or rear panel 28 towards the ground with the help of spring 58, thereby collapsing the boat hunting blind 10 to the down position. It should be understood that when blind collapsing mechanism 54 is operated/pulled down, each leg 42 including first part 44 and second part 46 bends or folds or collapses at center stop bracket 48 and pulls down corner bracket 30 connecting front panel 24, end panel 26 and rear panel 28 towards the ground. In other words, the user pulls pull wire 62 of two legs leg 42 that results in bringing down or collapsing two legs on each end. User repeats this on other side to collapse the other side of skeletal frame 20. In order to increase or raise the height of front panel 24, end panel 26 and rear panel 28 with respect to the ground, a user lifts front panel 24 or rear panel 28 in the center and legs 42 on that end. Here, the user lifts them together due to independent springs 58 each leg 42 has. This results in spring 58 getting released such that legs 42 are made to come to an upright position or released position.

Figure 12:
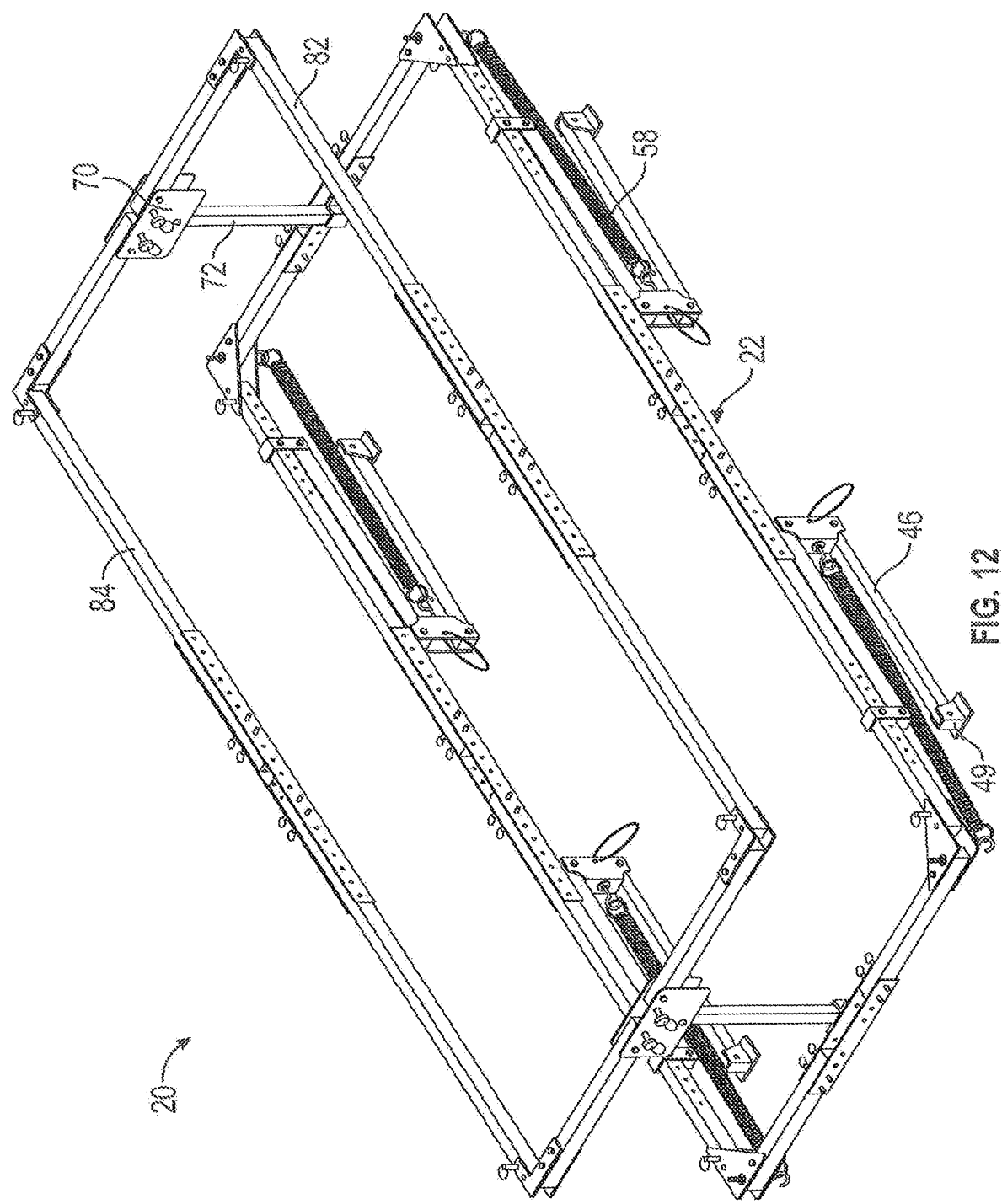
FIG. 12 illustrates the blind side panel in collapsed position while retaining the blind top panel over it.

Springs 58 allow the hunter to grab the front or rear panels at center and lift. The hunter does not have to handle each leg 42 like most known blinds. Springs 58 engage and help the hunter to lift the skeletal frame 20 up. Each leg 42 has a center stop bracket 48. The first part 44 and second part 46 (i.e., upper and lower legs) are attached to the center stop bracket 48. The spring 59 pulls the center stop bracket 48 towards the front and rear ends of the blind. The legs 42 hit the center stop bracket 48 and force/pull of the spring 58 to hold the legs 42 in place, thus locking the legs 42 with spring force against the stop. The bottom of the lower leg is connected to the foot 49, which has an ankle pivot hole allowing the leg 42 to pivot. The first part 44 towards the top has a hole which is connected to U-clip 50, which is attached to the main side frame of the blind, which allows the top of the first part 44 to pivot. By having spring 58 on both sides, when the hunter lifts in the center of the rear or front panels, the legs 42 lift simultaneously and lock in the up position. To lower the skeletal frame 20 to the down position, there are two pull wires 62, at each end of the blind, attached to each leg's center stop bracket 48. The hunter grabs pull wires 62 at the same time and pulls both legs 42 to lower them simultaneously (FIGS. 9B and 12).

Figure 7A:
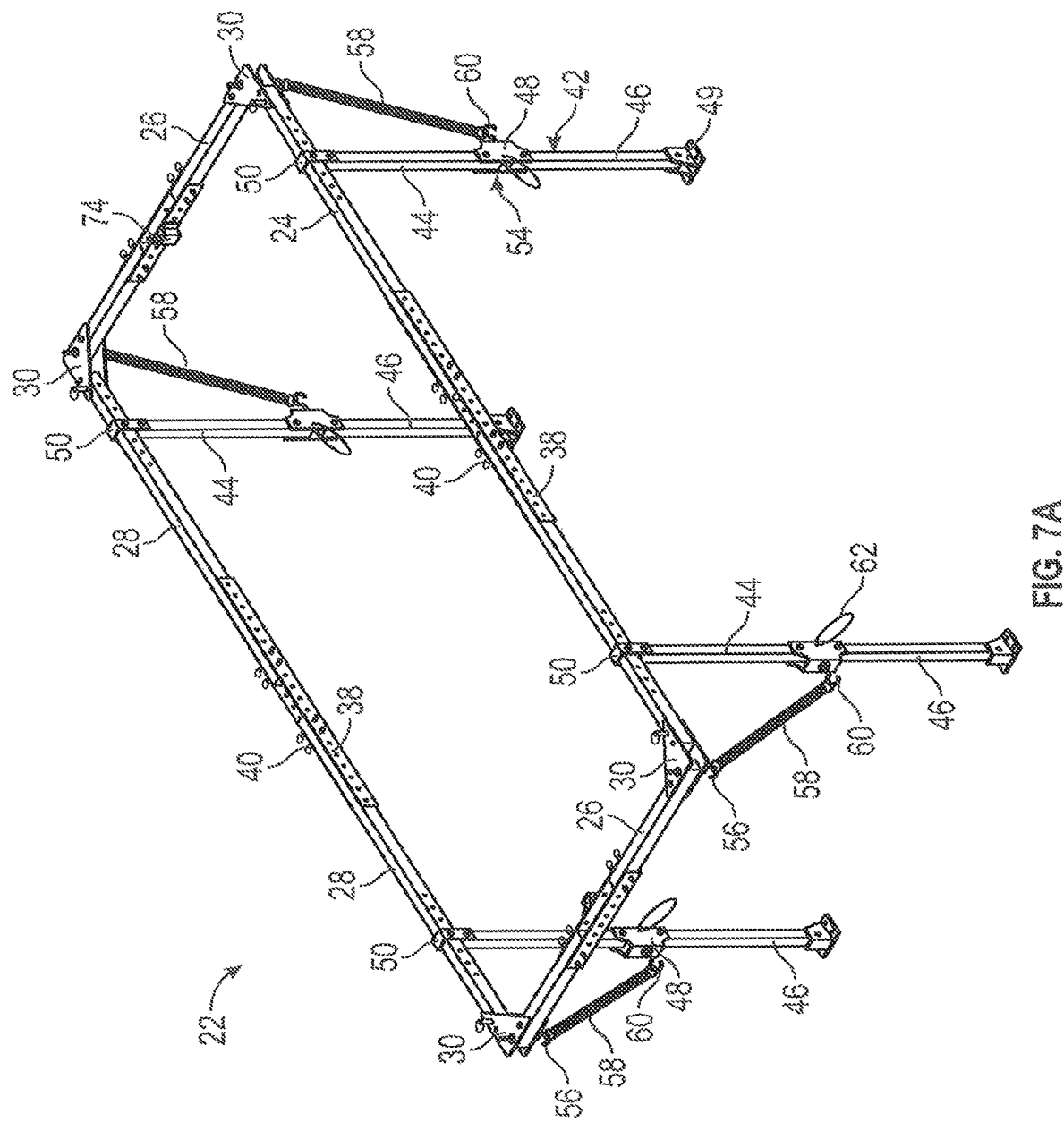
FIGS. 7A, 7B, 8A, 8B, 9A, and 9B show various perspective and side views of the blind side panel in which the legs are operated to position the blind side panel at various heights from the ground or surface.
Figure 7B:
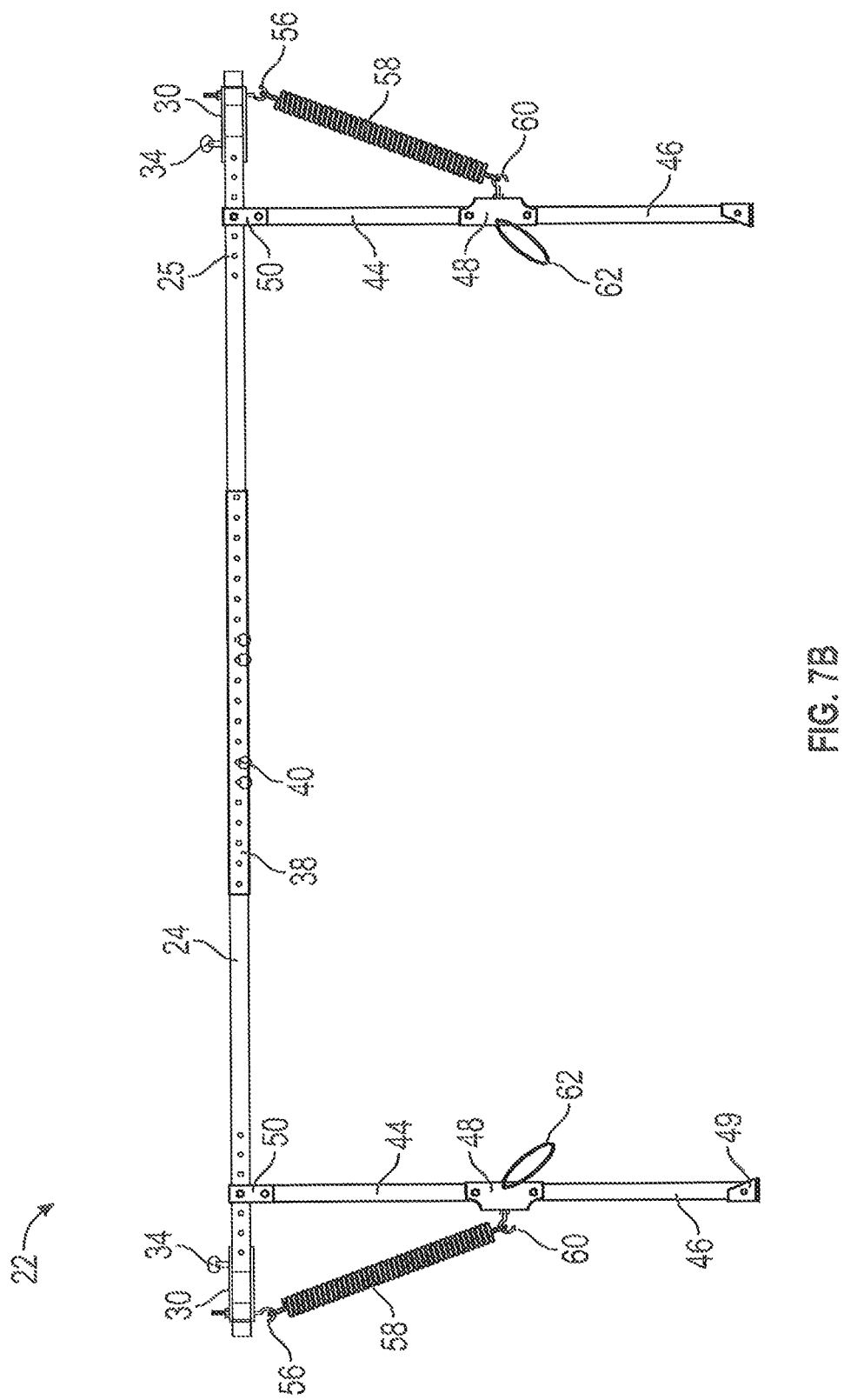
Figure 8A:
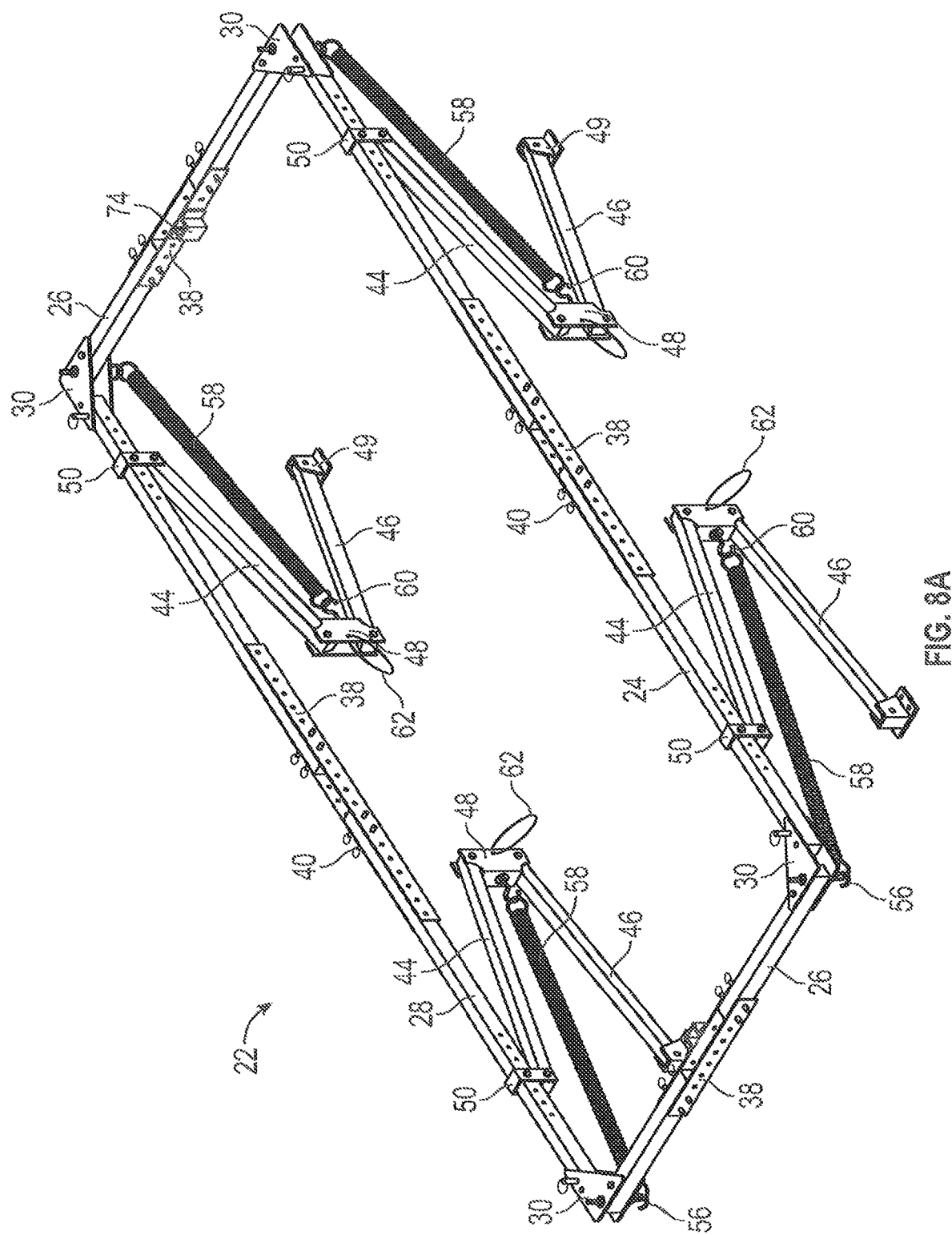
Figure 8B:
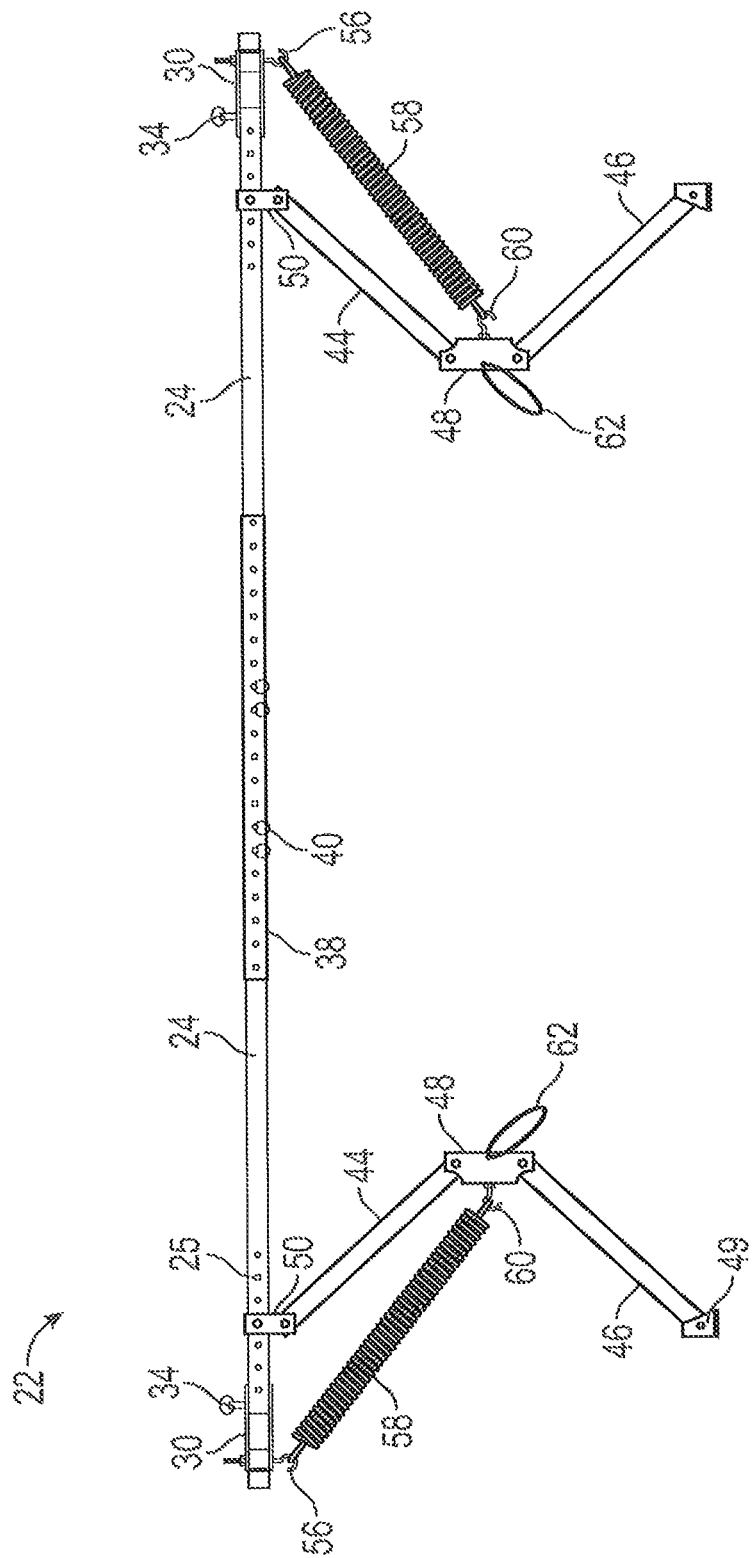
Figure 9A:
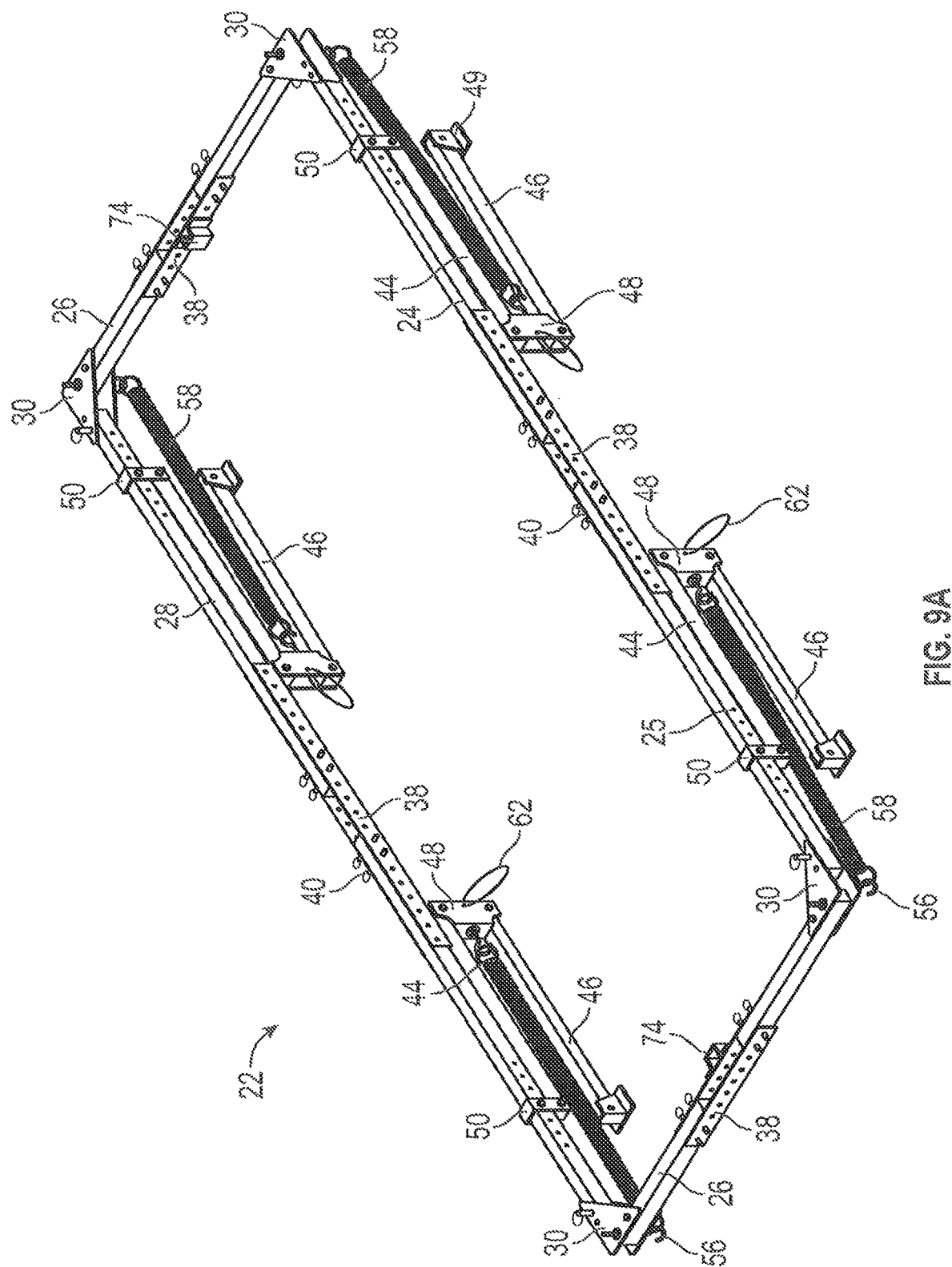
Figure 9B:
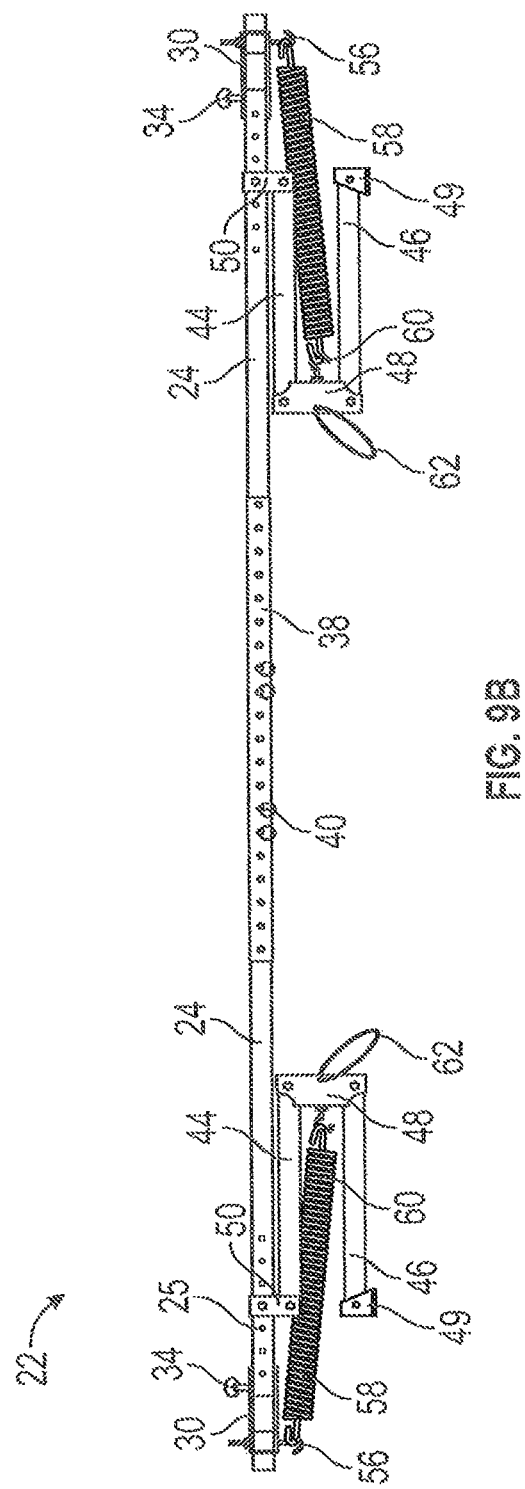

FIGS. 7A to 9B show various perspective and side views of blind side panel 22 in which legs 42 are operated to position blind side panel 22 from collapsed position to upright position. It should be understood that FIGS. 7A and 7B show a perspective and a side view of blind side panel 22 in which legs 42 are positioned in upright position. FIGS. 8A and 8B show a perspective and a side view of blind side panel 22 in which legs 42 are bent/collapsed partially thereby reducing the height as compared to height shown in FIGS. 7A and 7B. As specified above, the user may operate blind collapsing mechanism 54 to adjust the height of blind side panel 22 (front panel 24 and rear panel 28) from the ground. FIGS. 9A and 9B show blind side panel 22 in fully collapsed position.

Figure 10B:
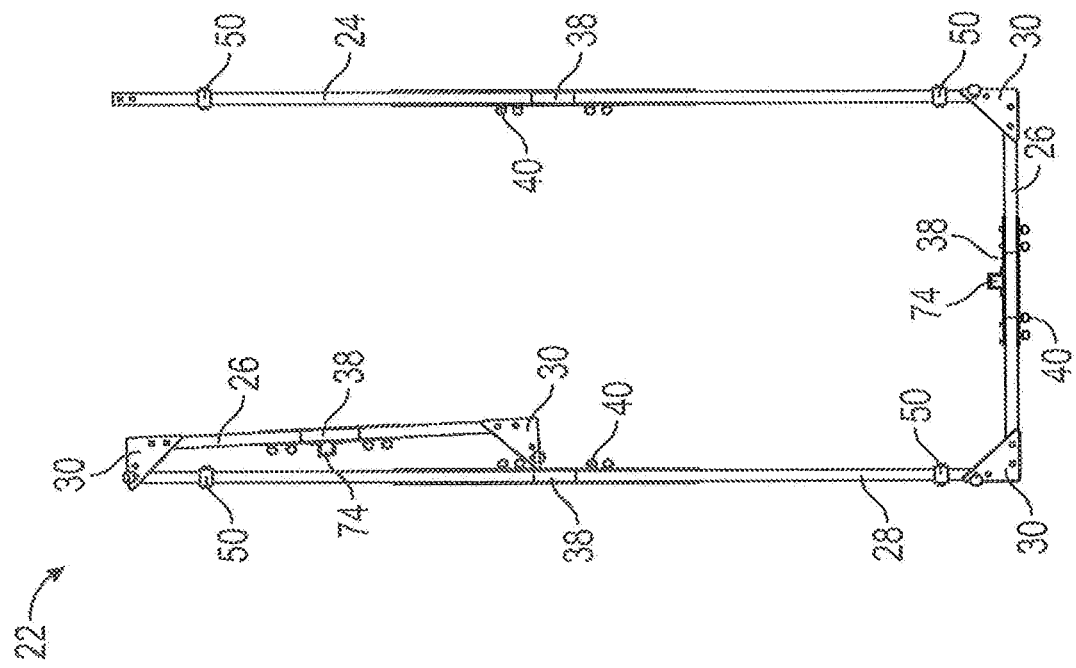
FIGS. 10A and 10B illustrate top views of the blind side panel showing an aspect of installing and uninstalling an end panel from a front panel while being mounted to a rear panel.
Figure 10A:
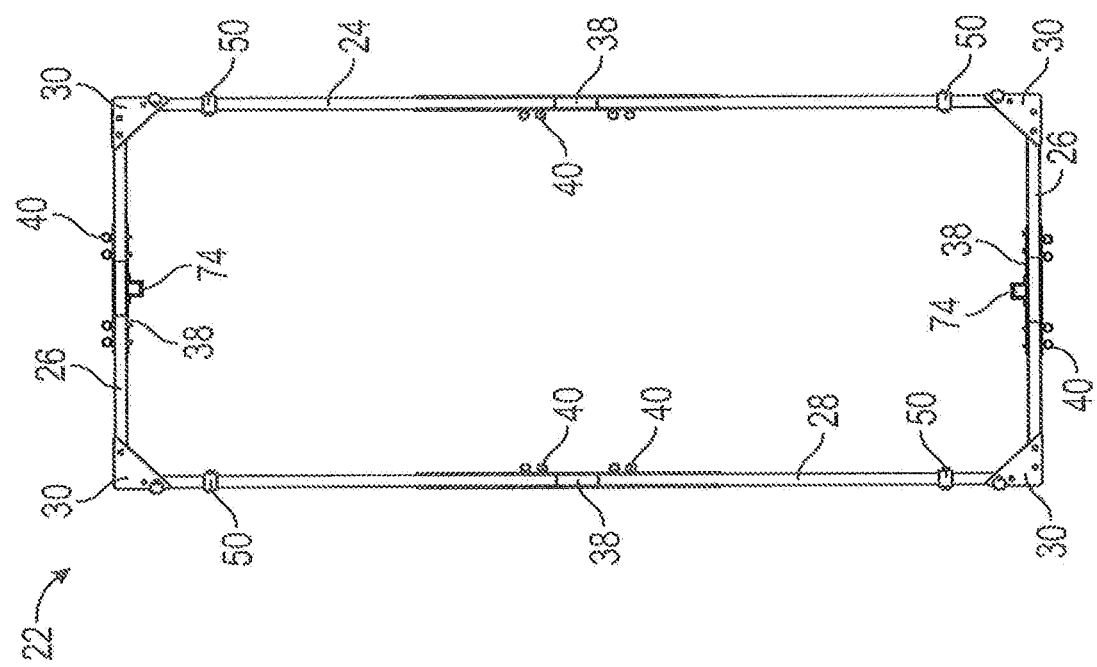

Now referring to FIGS. 10A and 10B, top views of blind side panel 22 illustrating a feature of uninstalling end panel 26 from front panel 24 while being mounted to rear panel 28 is shown. Specifically, FIG. 10A shows the top view of blind side panel 22 in which end panel 26 are mounted to front panel 24. FIG. 10B shows end panel 26 from front panel 24 while being mounted to rear panel 28. Here, removing pin from end panel 26 allows to rotate end panel 26 to the side. This allows the use to open a rear seat area of obstruction, so the head of the motor will not dip down and damage rear panel 28 or the motor.

In order to uninstall end panel 26 from front panel 24, fastener 32 may be disengaged and end panel 26 may be folded towards rear panel 28. Similarly other side end panel 26 may be uninstalled from front panel 24 and folded. By uninstalling end panel 26, blind side panel 22 can be easily folded and transported when not in use thereby saving space.

Referring back to FIG. 2, skeletal frame 20 further includes center brackets 70 for mounting blind side panel 22 and blind top panel 80. Each center bracket 70 is mounted to blind side panel 22 using connecting rod 72. Specifically, connecting rod 72 is mounted to end panel 26 with the help of center bracket socket 74. In one example, connecting rod 72 may be provided with holes (not shown) such that the height of center bracket 70 from blind side panel 22 may be adjusted. In order to facilitate height adjustment, a pin (not shown) may be inserted into the hole of connecting rod 72 and center bracket socket 74.

The blind top panel 80 includes front top panel 82 and rear top panel 84. Front top panel 82 and rear top panel 84 may be made up of aluminum round or square tubing, however other shape may also be used. Front top panel 82 and rear top panel 84 are provided in a U-shape configuration. Each of front top panel 82 and rear top panel 84 is pivotally mounted to center brackets 70 provided at far sides. It should be understood that front top panel 82 and rear top panel 84 pivotally mounted to center brackets 70 with the help of a fastener. As specified above, front top panel 82 and rear top panel 84 are provided in a U-shape configuration. In order to connect corner panel of U-configuration front top panel 82 or rear top panel 84, corner support bracket 86 (similar to corner bracket 30) may be used. Further, top U-channels 87 (similar to U-channel 38) may be used for joining smaller panel forming the elongated portion of the U-shape structure of front top panel 82 or rear top panel 84. In one example, the panel may be pinned to top U-channel 87 using fasteners or pins 88.

Figure 11:
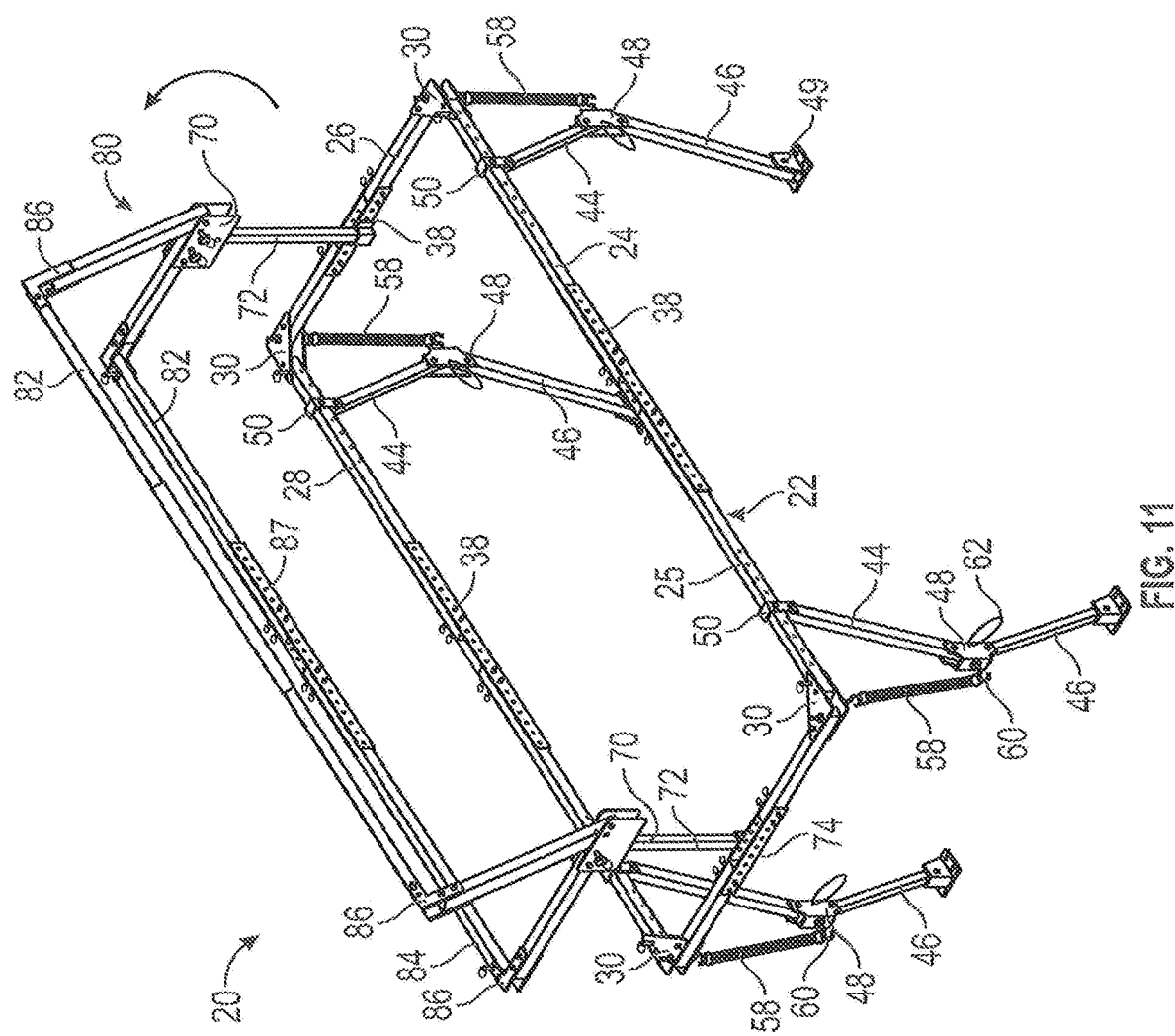
FIG. 11 illustrates an aspect of the presently disclosed boat hunting blind including the ability to fold back the blind top panel.

Due to the construction of center brackets 70, they act as pivot points for front top panel 82 and rear top panel 84 that form one dual-action top. As such, front top panel 82 can be thrown back towards rear top panel 84, or vice versa. FIG. 11 shows an aspect of skeletal frame 20, which has an ability to throw back blind top panel 80. Specifically, FIG. 11 shows front top panel 82 thrown back over rear top panel 84. By allowing front top panel 82 to be thrown back, skeletal frame 20 provides an access point from top front half of skeletal frame 20. Similarly, rear top panel 84 can be thrown back for providing an access point from the top rear half of skeletal frame 20. FIG. 12 shows a feature of blind side panel 22 in collapsed position while retaining blind top panel 80 over it.

The boat hunting blind 10 further includes a skirt 90 put around skeletal frame 20 to envelope skeletal frame 20, as shown in FIG. 1. Skirt 90 indicates a fabric that acts as a wind blocker. As such, skirt 90 may also be referred as win blocker. Skirt 90 provides a material made of waterproof and/or windproof material. As can be seen, skirt 90 envelopes blind side panels 22. At the outside, skirt 90 includes brushes 92 that are tied to it with the help of a plurality of brush straps 94. In one example, plurality of brush straps 94 is sewn into skirt 90. Alternatively, plurality of brush straps 94 are attached to skirt 90 using known mechanisms. Boat hunting blind 10 further includes a blind top 96 that mounts over blind top panel 80. Blind top 96 indicates a see-through mesh for permitting a hunter to see flying game while concealing the hunter behind blind top panel 80.

Figure 13:
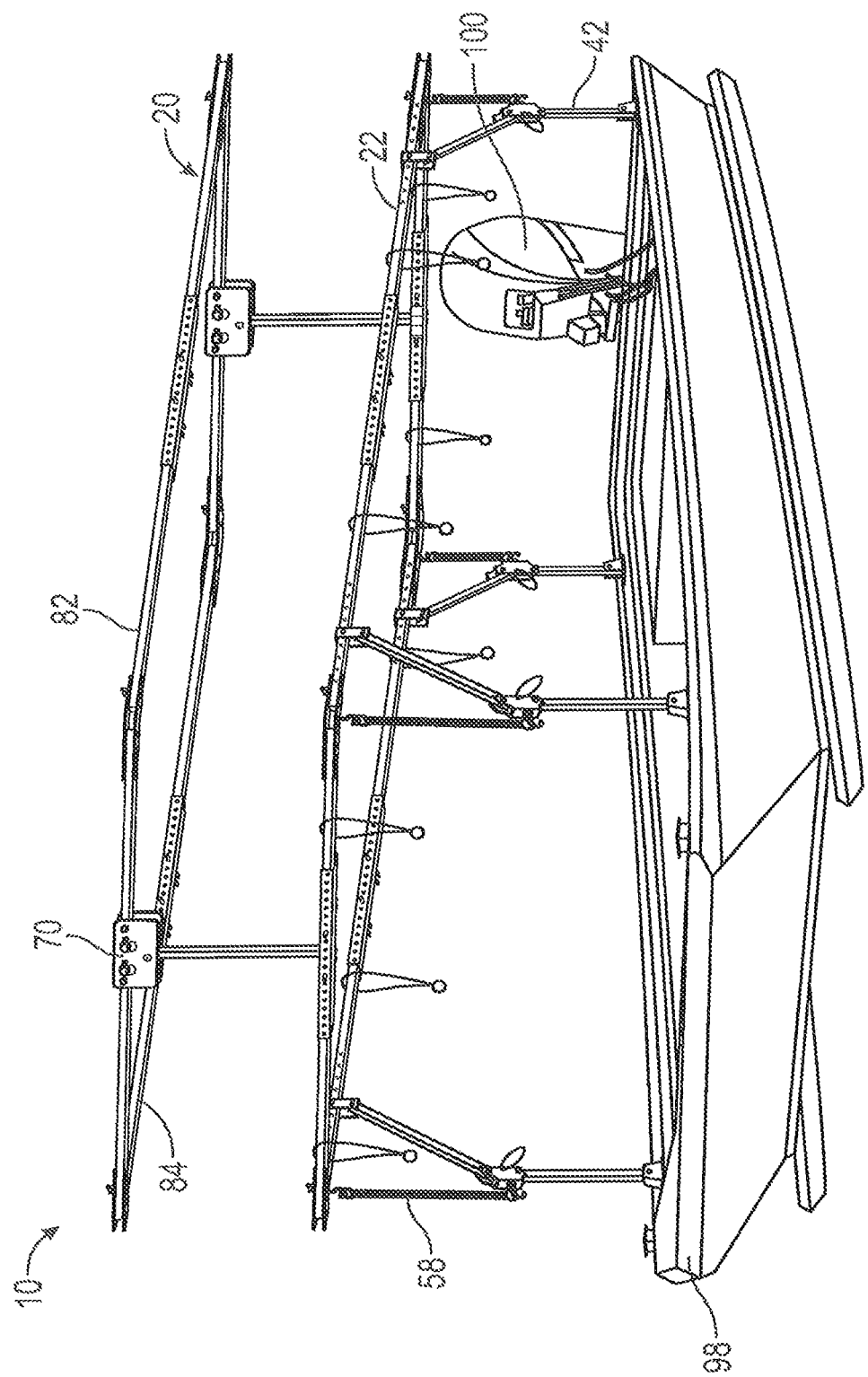
FIG. 13 illustrates a feature of mounting the skeletal frame to a boat, in accordance with one embodiment of the present disclosure.
Figure 14:
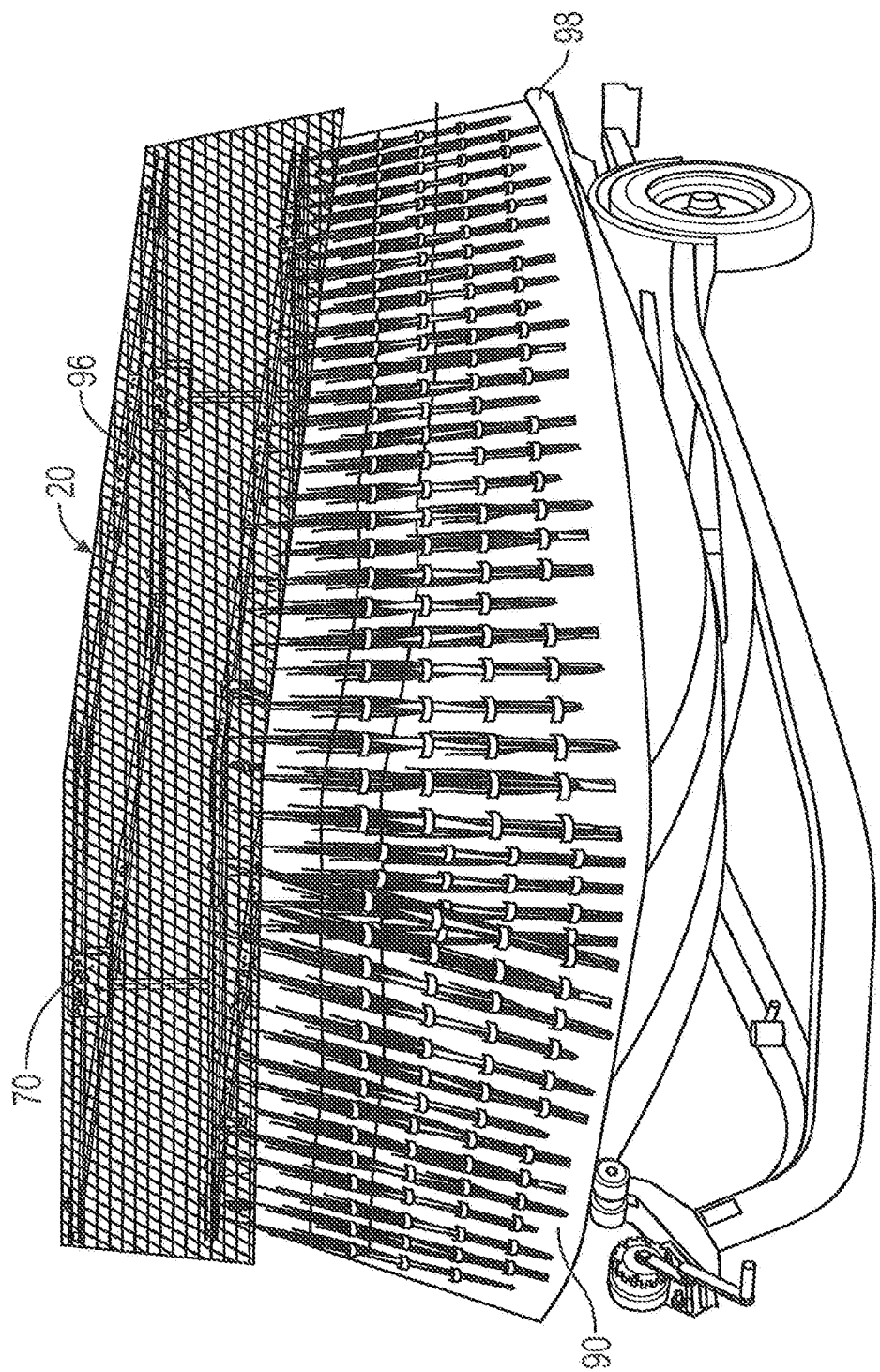
FIG. 14 illustrates a feature of mounting the boat hunting blind on the boat.

As specified above, boat hunting blind 10 allows for mounting on a boat. In order to mount on a boat, at first, a hunter mounts skeletal frame 20 on a boat 98 as shown in FIG. 13. Specifically, the hunter mounts foot 49 to boat 98. In one example, the hunter mounts right side 16 closer to a motor 100 in boat 98. Here, the hunter the length and width of front panel 24, end panel 26 and rear panel 28 as explained above depending on the length of boat 98 or as needed. Subsequently, the hunter envelopes skirt 90 around blind side panel 22 and places blind top 96 on blind top panel 80 as shown in FIG. 14.

Figure 15:
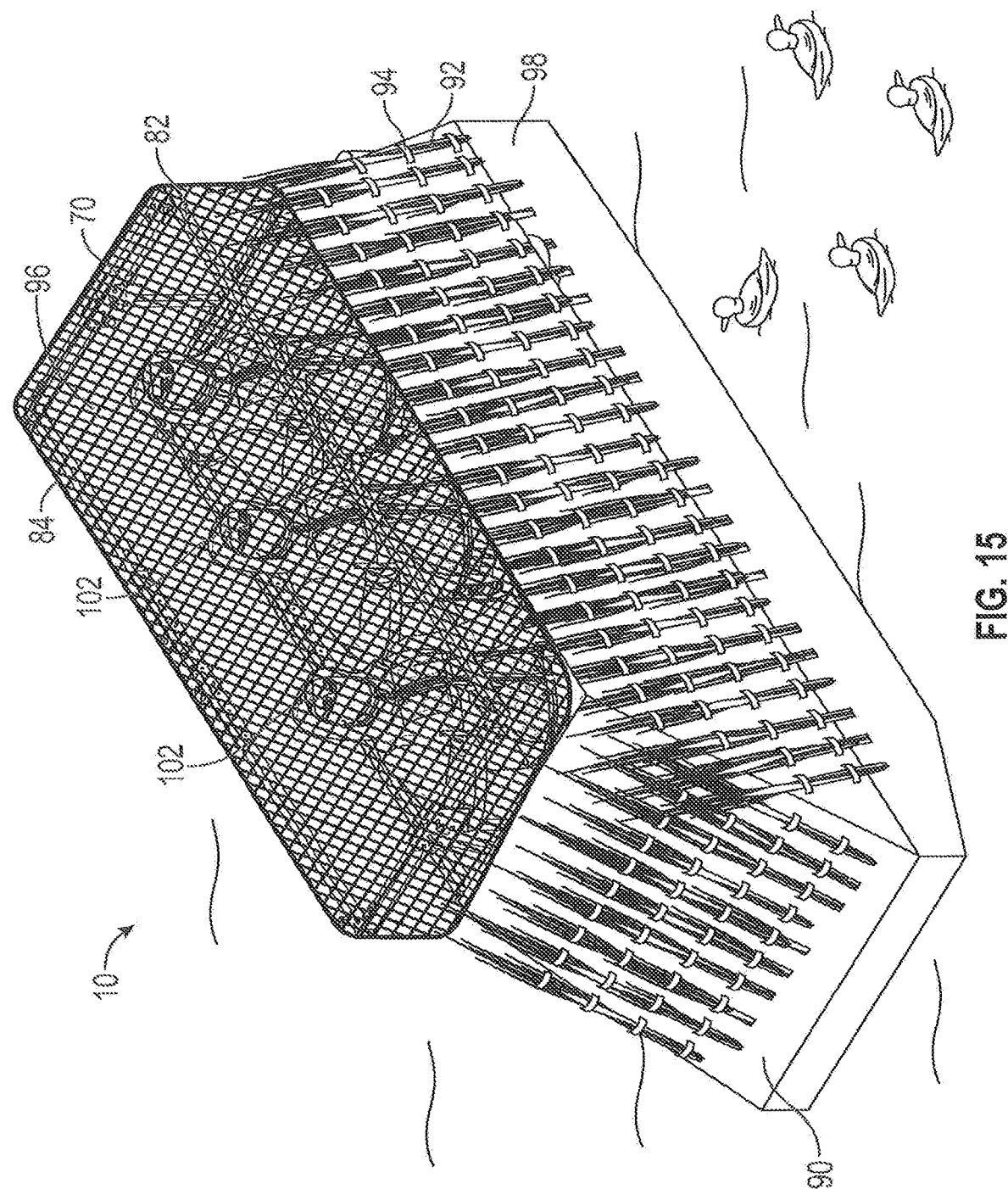
FIG. 15 shows a feature of hunters sitting inside the boat hunting blind.
Figure 16:
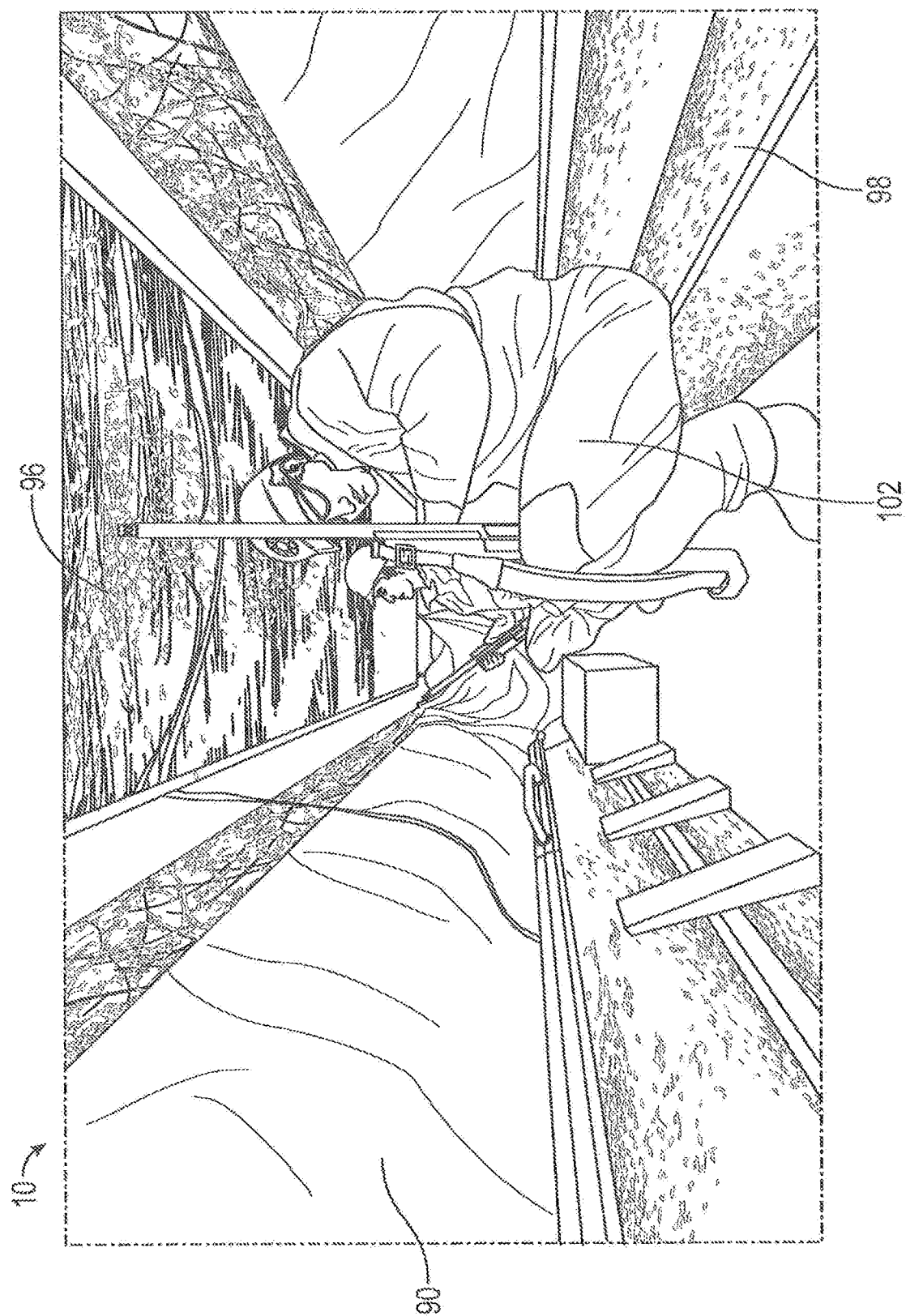
FIG. 16 shows exemplary inner view of the boat hunting blind in which hunters tie up the blind top to achieve an unobstructed view.

In operation, one or more hunters 102 sit inside boat hunting blind 10 and maneuver boat 98 closer to game 104. FIG. 15 shows a feature of hunters 102 sitting inside boat hunting blind 10, in accordance with one embodiment of the present disclosure. FIG. 16 shows inner view of boat 98 wherein hunters 102 are seated on the boat 98.

In one implementation, brushes 92 are tied around the edges of blind top panel 60 for camouflaging boat hunting blind 10 in a shallow field or lake environment thereby creating a more natural look. Brush straps 94 breakup the hard edges of the gap formed between blind side panel 22 and blind top panel 60, and make boat hunting blind 10 look more natural, while allowing the hunters to look 360-degrees unencumbered, all while still having a top directly overhead.

The skirt 90 suspends, blocks the wind and provides concealment. It should be understood that blind side panel 22 together with skirt 90 interconnect to provide a camouflaged wall perimeter for concealing the hunter from flying or land-based game during a hunt. The wind blocking functions of skirt 90 deliver 360-degree wind protection and concealment. In other words, skirt 90 when put around blind side panel 22 forms a wall around skeletal frame 20. Further, blind top 96 conceals the hunter inside (FIG. 15), but also allows some visibility when birds are directly overhead.

In another embodiment, blind top panel 80 is fully adjusted, from top down such that no gap exists between blind top panel 80 (blind top 96) and skirt 90, and the hunter 102 always looks through blind top 96 for spotting the game 106. Similarly, blind top panel 80 may be raised for creating an open-air gap between blind top panel 80 (blind top 96) and skirt blind 90 (blind side panel 22) for allowing hunters 102 to spot game 106 from far distance.

In use, blind top 96 is directly overhead where most hunters 102 flare/spook the birds when they are directly overhead. The gap allows the hunters to see birds off in the distance. The further off in the distance are the birds the more difficult it is to gauge how far they actually are if they're looking through blind top 96. As the birds or game 106 approach boat hunting blind 10, hunters 102 can lean back beneath blind top 96, when the birds 106 are directly overhead. They can turn and follow the birds 106 without spooking the birds. This greatly enhances all hunters' enjoyment, because watching birds in-flight provides some of the most enjoyable aspects of the wildlife hunting experience.

Blind top 96 uses a see-through mesh that allows the hunters to see out and the birds not to see in. Ducks/geese/waterfowl are constantly looking for predators or inconsistencies in the terrain. Blinds without tops, when combined with the sun, the angle of the sun when hitting the outer wall of the blind, this creates a shadow inside the blind. When birds are overhead, they can see these dark shadows. On top of this, with numerous hunters in the blind, all moving, turning their heads, and trying to follow the birds' flight path. Oftentimes, a guide or lead hunter will instruct their group to keep their heads down. Not all hunters are disciplined or experienced enough to do this properly. It's hard to control the movement when four to six hunters occupy the blind.

Blind top 96 of the presently disclosed boat hunting blind 10 eliminates the shadow and the movement problems with known hunting blinds. The result is a better blind that will materially benefit the hunter to achieve a successful hunting experience.

Figure 17:
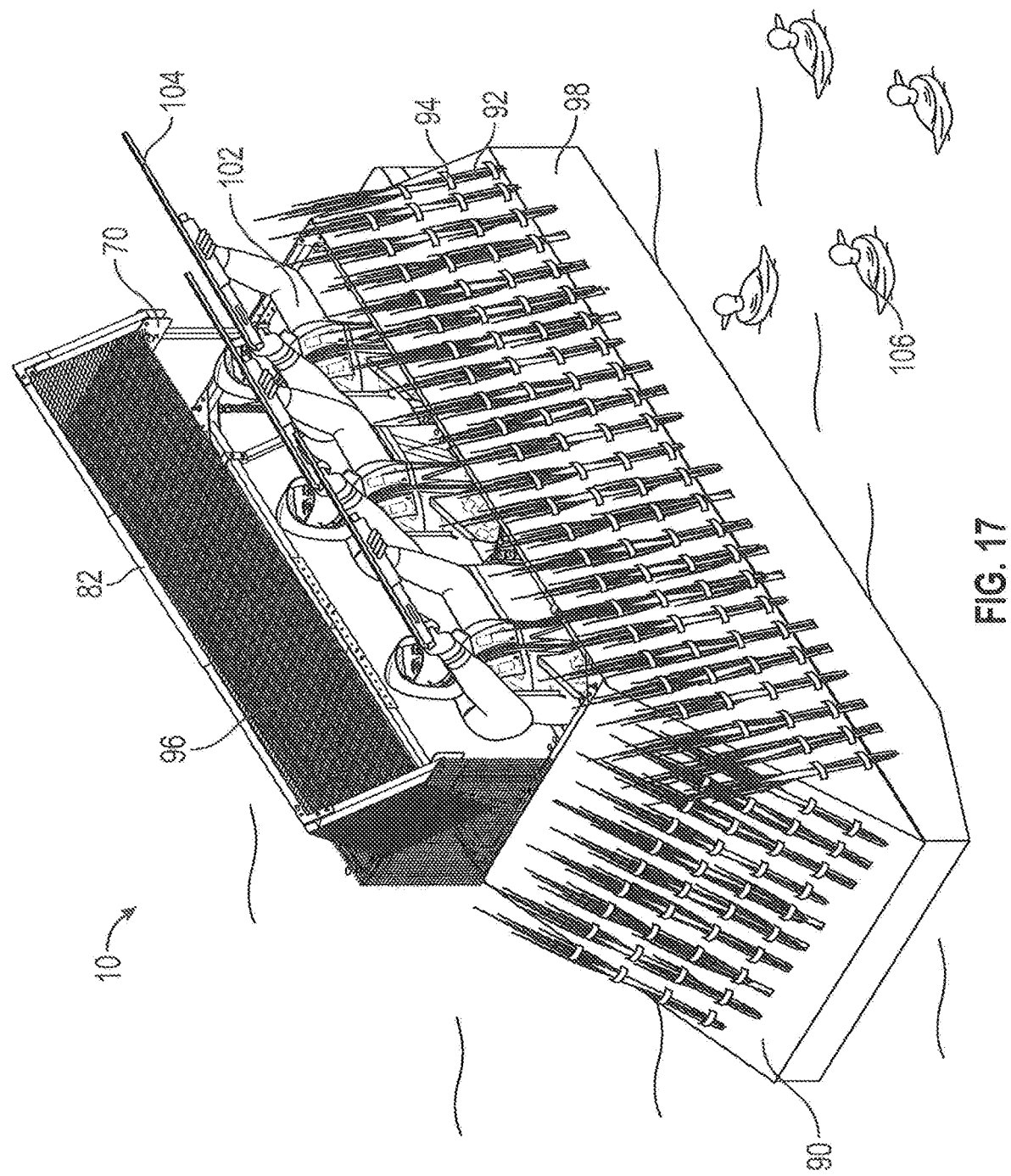
FIG. 17 illustrates a feature in which hunters throwback front top panel and stand to shoot a flying or land-based game.

Also, when birds are about to land, the majority of the time boat hunting blind is positioned where the front of the boat hunting blind is facing where the birds will most likely land based on the wind and the decoy locations. As a result, with the birds not being directly overhead, the hunter can lean forward and see the ducks unencumbered through the gap and hanging brushes. The gap allows the hunter to watch the birds as they approach to land and because the top throws back. In this situation, the hunter may throw back blind top panel 80 i.e., front top panel 82 without ever losing sight of the birds he is planning to shoot. Similarly, if the hunter 102 spots a bird 106 at rear side 14, hunter 102 may throw back rear top panel 84 without ever losing sight of the birds 106 he is planning to shoot. FIG. 17 shows a feature of hunters 102 using a firearm 104 to shoot. Here, one or more hunters 102 throwback front top panel 82 and stand to shoot the flying or land-based game 106 using firearm 104.

As specified above, blind top panel 80 including blind top 96 covers the entire area of boat hunting blind 10, i.e., front to back and end to end. Blind top panel 80 pivots from each end to allow only one person to engage blind top panel 80 for all hunters in boat hunting blind 10, instead of multiple tops per hunter. Blind top panel 80 of present boat hunting blind 10 opens to the rear and front and remains inside the perimeter of boat hunting blind 10, without falling outside boat hunting blind 10 or hunting boat. Designing blind top panel 80 so it throws behind the hunter allows blind top panel 80 to open without ever impeding the hunter's view of the birds 106 while shooting. Further, blind top 96 along with blind top panel 80 when extended/unfolded fully or thrown back/folded holds its shape.

When blind top panel 80 is thrown back, the hunters may stand and have plenty of room to shoot out the front. With the disclosed subject matter, blind top panel 80 folds on top of itself and remains inside the walls of skirt 90. Blind top panel 80 including blind top 96 does not contact the outer wall brush. Many hunters prefer tall wavy brush. If tall brushes 92 stand against outer wall of skirt 90, then blind top panel 80 including blind top 96 cannot fall outside of skirt 90 because it will hit the brushes 92. Thus, it is preferred to allow blind top panel 80 including blind top 96 to fall onto the front or back half remaining inside the confines of the perimeter to not come in contact with the brushes 92.

In essence, the present invention provides a boat hunting blind including a blind top panel providing end-to-end and front-to-back concealment, that after being engaged and thrown to the front or rear.

The blind top panel pivots from each end to allow only one person to engage the blind top panel for all hunters in the boat hunting blind, instead of multiple blind top panels per hunter. The blind top panel of the present boat hunting blind opens to the rear and front and remains inside the perimeter of the boat hunting blind, without falling outside the boat hunting blind. Designing the blind top panel so it throws behind the hunter allows the blind top panel to open without ever impeding the hunter's view of the birds while shooting.

The presently disclosed boat hunting blind provides full coverage with a wider skirt, as such the shadow of blind top at the front to rear and side to side is eliminated. This is because the blind top covers 100% of the skeletal frame beneath it and avoids gap shadow. The brushes or mesh flaps overhand the skirt and allow hunters to shoot out the port or starboard side of the boat. Top panel say the front top panel falls onto rear top panel and remains within the perimeter of the skeletal frame (blind side panel). This prevents damage to the brushes that protrude above the top edge of skeletal frame.

End panel pivots to either side of the boat. This allows to open up the rear area of the boat and allows the hunter to operate the motor for propelling the boat.

Further, the blind collapsing mechanism at the legs allow blind side panels in position in collapsed position or upright position. This allows hunters to hunt in either collapsed position (FIG. 12) or upright position. The springs allow the hunter to grab the front or rear panels at center and lift. The hunter does not have to handle each leg like most known blinds. The springs engage and help the hunter to lift the skeletal frame up. Each leg has a center stop bracket. The upper and lower legs are attached to the center stop bracket. The spring pulls the center stop bracket (leg bracket) towards the front and rear ends of the blind. The legs hit the center stop and force/pull of the spring to hold the legs in place, thus locking the legs with spring force against the stop. The bottom of the lower leg is connected to the foot, which has an ankle pivot hole allowing the leg to pivot. The upper leg towards the top has a hole which is connected to a u-clip, which is attached to the main side frame of the blind, which allows the top of the upper leg to pivot. By having a spring on both sides of the blind, when the hunter lifts in the center of the rear or front frame, the legs lift simultaneously and lock in the up position. To lower the blind to the down position, there are two pull wires, at each end of the blind, attached to each leg's center stop bracket. The hunter grabs both of them at the same time and pulls both legs to lower them simultaneously.

When the blind is in the collapsed position, the dual-action top can still be positioned to the skeletal frame of the blind. The top panel sits above the skeletal frame of the blind as much as 10-12". This allows the hunter to sit on the floor of the boat, while still being completely concealed. For example, when hunters are hunting in tall bushes, the boat hunting blind can be concealed while still being in the up position, however, hunters are hunting in an open field, without brush and only have areas where there are short grass or little to no brush, hunters can use this low-profile position to blend in better than the boxy upright position. The lower profile can simulate a shallow spot where grass is able to grow or in a swamp where swamp weed grows on the floor of the swamp. The skirt and blind top can hide the sides and bow of the boat when in the down position. This is another advantage of the presently disclosed boat hunting blind.

The U-channel includes pre-drilled/punched holes which allows hunters to slide adjust the panels, inside the u-channel and quickly set the length and width of the panels. Most blinds require cutting the panels and hunters have to drill additional holes and when they have insert bolts and tighten, it depresses the aluminum against the inner telescoping tubing. When this happens it is very difficult to use the blinds on another boat. The presently disclosed boat hunting blind provides a U-channel having square tubing with pre-drilled holes, which make it fast to customize the blind on the boat. The presently disclosed boat hunting blind allows hunters to quickly remove the blind, adjust the width and length to fit another boat of different size.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort may be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed:

1. A boat hunting blind, comprising:
 a blind side panel, comprising:
  a front panel;
  an end panel mounted to the front panel;
  a rear panel mounted to the end panel; and
  a plurality of legs provided at the front panel and the rear panel, wherein each leg comprises a blind collapsing mechanism comprising a spring mounted to the front panel and the rear panel for allowing the legs to collapse and stand for positioning in collapsed position and upright position;
 a blind top panel comprising a front top panel and a rear top panel, the front top panel and the rear top panel pivotally mounted to center brackets, the center brackets being mounted to the end panel;
 the blind side panel mounted on a boat;
 a skirt suspended from the blind side panel enveloping the blind side panel for camouflaging a hunter; and
 a blind top mounted over the blind top panel for concealing the hunter from above,
 wherein a) the front top panel comprising the blind top is thrown back over the rear top panel for providing an open top at a front side for the hunter to shoot a waterfowl; and b) said boat hunting blind permits using said blind top when said legs are in a collapsed position, wherein said blind top further comprises a plurality of center brackets at each end for providing said blind top to protrude upward up above at least one end panel and a lower frame of said boat hunting blind, end to end and side to side, such that said blind top is positioned up above the lower frame to a position sufficiently high enough to enable sitting on a boat floor and hunting with said boat hunting blind in said collapsed position.

2. The boat hunting blind of claim 1, wherein the blind side panel further includes a corner bracket having a loop facing a surface for mounting a spring.

3. The boat hunting blind of claim 2, wherein each leg of said plurality of legs comprises a first part and a second part, wherein the first part and the second part are pivotally mounted using a center stop bracket,
 wherein the first part is mounted to the front panel or the rear panel, and the second part is mounted to a foot that mounts to a boat, and
 wherein one end of the spring is mounted to the loop of the corner bracket and other end is mounted to the center stop bracket, and the spring is operated for collapsing or releasing the first part and the second part and for pulling the front panel, the end panel and the rear panel for positioning the blind side panel in the upright position or collapsed position.

4. The boat hunting blind of claim 3, wherein the center stop bracket comprises a pull wire that allows the hunter to pull down the legs to bring them to the collapsed position.

5. The boat hunting blind of claim 1, wherein the front top panel comprising the blind top is thrown back over the rear top panel for providing an open top at a front side for the hunter to shoot the waterfowl, or the rear top panel comprising the blind top is thrown back over the front top panel for providing an open top at a rear side for the hunter to shoot the waterfowl.

6. The boat hunting blind of claim 1, wherein each of the front panel and the rear panel is provided in two halves connected using a centrally located U-channel.

7. The boat hunting blind of claim 1, wherein each leg includes a U-clip that connects to the front panel, the end panel and the rear panel.

8. The boat hunting blind of claim 7, wherein each of the front panel, the end panel and the rear panel includes holes, wherein the U-clip mounts at the holes and allows for adjusting the length of the front panel, the end panel and the rear panel.

9. The boat hunting blind of claim 1, wherein each of the center brackets is mounted to the end panel using a connecting rod.

10. The boat hunting blind of claim 1, wherein the blind top comprises a see-through mesh for allowing the hunter to see outside while concealing the hunter from outside.

11. A boat hunting blind, comprising:
 a blind side panel, comprising:
  a front panel;
  an end panel removably mounted to the front panel;
  a rear panel mounted to the end panel; and
  a plurality of legs provided at the front panel and the rear panel, wherein each leg comprises a blind collapsing mechanism comprising a spring mounted to the front panel and the rear panel for allowing the legs to collapse and stand for positioning in collapsed position and upright position;
 a blind top panel comprising a front top panel and a rear top panel, the front top panel and the rear top panel pivotally mounted to center brackets, the center brackets being mounted to the end panel;
 the blind side panel mounted on a boat;
 a skirt suspended from the blind side panel enveloping the blind side panel for camouflaging a hunter; and
 a blind top mounted over the blind top panel for concealing the hunter from above,
 wherein the front top panel comprising the blind top is thrown back over the rear top panel for providing an open top at a front side for the hunter to shoot a waterfowl, or
 wherein the rear top panel comprising the blind top is thrown back over the front top panel for providing an open top at a rear side for the hunter to shoot the waterfowl.

12. The boat hunting blind of claim 11, wherein said boat hunting blind permits using said blind top when said legs are in a collapsed position, wherein said blind top further comprises a plurality of center brackets at each end for providing said blind top to protrude upward up above at least one end panel and a lower frame of said boat hunting blind, end to end and side to side, such that said blind top is positioned up above the lower frame to a position sufficiently high enough to enable sitting on a boat floor and hunting with said boat hunting blind in said collapsed position.

13. The boat hunting blind of claim 11, wherein the blind panel further includes a corner bracket having a loop facing a surface for mounting a spring.

14. The boat hunting blind of claim 13, wherein each leg of said plurality of legs comprises a first part and a second part, wherein the first part and the second part are pivotally mounted using a center stop bracket,
   wherein the first part is mounted to the front panel or the rear panel, and the second part is mounted to a foot that mounts to a boat, and
   wherein one end of the spring is mounted to the loop of the corner bracket and other end is mounted to the center stop bracket, and the spring is operated for collapsing or releasing the first part and the second part and for pulling the front panel, the end panel and the rear panel for positioning the blind side panel in upright position or collapsed position.

15. The boat hunting blind of claim 11, wherein each of the front panel and the rear panel is provided in two halves connected using a centrally located U-channel.

16. The boat hunting blind of claim 15, wherein each leg includes a U-clip that connects to the front panel, the end panel and the rear panel.

17. The boat hunting blind of claim 16, wherein each of the front panel, the end panel and the rear panel includes holes, wherein the U-clip mounts at the holes and allows for adjusting the length of the front panel, the end panel and the rear panel.

18. The boat hunting blind of claim 11, wherein the center brackets are mounted to the end panel using a connecting rod.

19. The boat hunting blind of claim 11, wherein the blind top comprises a see-through mesh for allowing the hunter to see outside while concealing the hunter from outside.

20. The boat hunting blind of claim 11, wherein the skirt comprises brush straps for holding brushes for blending the boat hunting blind with environment.

21. A boat hunting blind, comprising:
   a blind side panel, comprising:
      a front panel;
      an end panel mounted to the front panel;
      a rear panel mounted to the end panel; and
      a plurality of legs provided at the front panel and the rear panel, wherein each leg comprises a blind collapsing mechanism comprising a spring mounted to the front panel and the rear panel for allowing the legs to collapse and stand for positioning in collapsed position and upright position;
   a blind top panel comprising a front top panel and a rear top panel, the front top panel and the rear top panel pivotally mounted to center brackets, the center brackets being mounted to the end panel;
   the blind side panel mounted on a boat;
   a skirt suspended from the blind side panel enveloping the blind side panel for camouflaging a hunter; and
   a blind top mounted over the blind top panel for concealing the hunter from above,
   wherein a) the front top panel comprising the blind top is thrown back over the rear top panel for providing an open top at a front side for the hunter to shoot a waterfowl; and b), wherein the end panel rotates and folds towards either the front panel or the rear panel allowing unencumbered use of rear area in the boat and use a motor to propel the boat.

* * * * *